(12) United States Patent
Wiese et al.

(10) Patent No.: US 12,014,291 B2
(45) Date of Patent: Jun. 18, 2024

(54) SYSTEM AND METHOD FOR PROCESSING DISTORTED OR INACCURATE INPUT DATA OBTAINED FROM AN ENVIRONMENT

(71) Applicant: ERNST & YOUNG GMBH WIRTSCHAFTSPRÜFUNGS-GESELLSCHAFT, Stuttgart (DE)

(72) Inventors: Michael Wiese, Essen (DE); Ludwig Mochty, Essen (DE)

(*) Notice: Subject to any disclaimer, the term of this patent is extended or adjusted under 35 U.S.C. 154(b) by 885 days.

(21) Appl. No.: 17/055,859

(22) PCT Filed: May 15, 2019

(86) PCT No.: PCT/EP2019/062545
§ 371 (c)(1),
(2) Date: Nov. 16, 2020

(87) PCT Pub. No.: WO2019/219783
PCT Pub. Date: Nov. 21, 2019

(65) Prior Publication Data
US 2021/0224674 A1    Jul. 22, 2021

(30) Foreign Application Priority Data
May 16, 2018 (EP) .................... 18172575

(51) Int. Cl.
*G06F 17/00* (2019.01)
*G06F 16/23* (2019.01)
(Continued)

(52) U.S. Cl.
CPC .......... *G06N 7/00* (2013.01); *G06F 16/2365* (2019.01); *G06Q 10/0635* (2013.01)

(58) Field of Classification Search
CPC ..... G06N 7/00; G06F 16/2365; G06F 11/079; G06F 11/0736; G06F 18/24323; G06Q 10/0635
(Continued)

(56) References Cited

U.S. PATENT DOCUMENTS

2007/0208244 A1* 9/2007 Brauker ............... A61B 5/6833
600/365
2012/0005527 A1* 1/2012 Engel ................. H04N 21/2408
714/E11.02

(Continued)

*Primary Examiner* — Jason T Edwards
(74) *Attorney, Agent, or Firm* — RC Trademark Company

(57) ABSTRACT

A regression planning and evaluation system that, when operated, obtains audit evidence, for example from manufacturing facility. The system comprises a server arrangement configured to (a) obtain input data, input data comprising data values of variables for multiple samples; (b) validate input data; (c) provide user with user interface to input audit parameters, audit parameters comprising at least one of: assurance level, tolerable error, statistical sampling technique; (d) generate regression plot and identify upper and lower acceptance bounds indicated with respect to regression line, regression plot represents variation of target variable with explanatory variable for samples and (e) identify key items to be tested, key items being samples falling outside the aforesaid acceptance bounds. Audit evidence, for example, can initiate further input data collection, further testing and so forth for reducing errors or distortions present in input data that was earlier acquired for analysis by system.

23 Claims, 6 Drawing Sheets

(51) Int. Cl.
*G06N 7/00* (2023.01)
*G06Q 10/0635* (2023.01)

(58) Field of Classification Search
USPC .......................................................... 706/11
See application file for complete search history.

(56) References Cited

U.S. PATENT DOCUMENTS

| | | | | |
|---|---|---|---|---|
| 2013/0201831 A1* | 8/2013 | Tal | ...................... | H04L 47/6225 |
| | | | | 370/235 |
| 2014/0052423 A1* | 2/2014 | Mun | ...................... | G06Q 10/04 |
| | | | | 703/2 |
| 2017/0360361 A1* | 12/2017 | Long | ........................ | A61B 5/11 |
| 2019/0012553 A1* | 1/2019 | Maruchi | ............... | G06F 11/079 |

* cited by examiner

SYSTEM AND METHOD FOR PROCESSING DISTORTED OR INACCURATE INPUT DATA OBTAINED FROM AN ENVIRONMENT

TECHNICAL FIELD

The present disclosure relates generally to systems that, when in operation, process distorted or inaccurate (namely erroneous) input data from an environment, for example input data obtained from at least one of: sensors, manual input data, databases; the systems identify such distortions and inaccuracies and then initiate various steps to try to improve the input data to reduce an effect of the distortions and inaccuracies. Moreover, the present disclosure relates to methods that are implemented using the aforesaid systems, wherein the methods includes processing the input data to identify distortions and inaccuracies therein, and then implementing one or more actions to address the distortions and inaccuracies. The systems and methods are applicable to processing genetic DNA readout data, audio and visual signal data, as well as captured sensor data, auditing records and such like, or any combination thereof. For example, the one or more actions can include obtaining more sensor signals, retesting an apparatus, collecting more auditing data and such like. Moreover, the present disclosure also relates to software products comprising non-transitory machine-readable data storage mediums having stored thereon program instructions, the program instructions being accessible by a processing device to execute the aforementioned methods.

BACKGROUND

Computer-implemented systems that process input data and apply mathematical algorithms to analyse distortions and inaccuracies in the input data to generate corresponding output data that is less encumbered by the distortions and inaccuracies are known. For example, granted patents EP097046B1 and GB2334015B ("Speech Analysis System", The Secretary of State for Defence) describe computer-implemented systems that receive input data representative of audio signals in a telephone system, and process the input data to determine distortions therein and then apply processing to the input data to correct for the distortions to render the audio signals more intelligible. The computer-implemented systems execute software that does not alter a manner in which computing hardware of the computing-implemented systems operate. Moreover, in a granted United Kingdom patent GB2559437B ("Prenatal Screening and Diagnostic System and Method", Congenica Ltd.), there is described a computer-implemented system that receives DNA readout data and processes the DNA readout data to determine errors therein, and applies a correction to the DNA readout data to correct for errors; the errors arise, for example, due to ambiguities and stochastic variations that occur when performing high-speed (PCR) genetic information readout from biological genetic samples.

Various configurations of data encoders and decoders are described in many recently granted European and United Kingdom patents, wherein the encoders and decoders are implemented using software executing on standard computing hardware that is arranged to execute one or more software products for implementing the encoders and decoders. The software does not change in any way a manner in which the computing hardware operates, but merely causes a change in entropy of data that is processed through the computing hardware; in such cases, a change of entropy of data when processed through the computing hardware is regarded as being a further technical effect, even when the data being processed may potentially be of synthetic origin (for example text files, computer-generated graphics files and so forth). From the foregoing, it will be appreciated that exclusions to patentability arising from the Strasbourg Convention (enshrined in Art 52(2) EPC and TRIPs) have to be construed very narrowly, relating to excluded subject matter as such only, otherwise the aforementioned granted patents would be totally inconsistent. The present invention relates to systems and methods that can be applied to input data, whether derived from sensors, manual data input or prerecorded in one or more databases.

Over the years, establishments such as mining facilities, manufacturing facilities, transport facilities, retailing facilities, banking facilities, and so forth have come into existence. During operation of these facilities, data is frequently generated, wherein the data can derive from sensing arrangements, manual data entry apparatus, cameras, measuring instruments and such like. These facilities perform several financial and non-financial operations during their operation, and therefore, are required to maintain detailed records pertaining thereto; for example, recording financial transactions or measured data results from equipment testing. However, such records need to be verified for accuracy and reliability, by a procedure known as an "audit". Although an "audit" is frequently used in relation to financial records, it is equally applicable to checking measurement results obtained from sensors, for example to determine whether or not a given manufactured product is fit for purpose or defective in any manner; for example, the measurements results potentially relate to ultrasonic testing of components to determine whether or not there are microfractures in the components, electrical stress testing and such like. Typically, audits involve thorough inspection and detailed analysis of records of a given establishment's financial and non-financial operations, to determine errors, inconsistencies, distortions of data and such like; such auditing is beneficial performed, for example, by applying various mathematical algorithms for achieving detection of distorted or inaccurate data. Furthermore, such audits need to be done regularly (namely, routinely) in order to maintain reliable financial records, reliable safety records, as well as to prevent frauds and improve credibility of a given establishment, for example for manufactured product quality assurance purposes.

Generally, in a conventional financial context, the audit is performed by an auditor having knowledge of accounting, business administration, auditing, and the like. In order to efficiently perform the audit, the auditor generally performs audit planning before starting the audit, wherein the audit planning includes two steps, one of assessing the risk of material misstatement and one to respond to those risks by obtaining audit evidence. Typically, the term "audit evidence" relates to all information (such as the records of the given establishment's financial and non-financial operations, information pertaining to the given establishment from other sources, and the like) that is utilised by the auditor to form an audit conclusion. Notably, such audit planning helps in development of appropriate audit strategies which need to be subsequently executed by the auditor. Therefore, the audit planning operation forms a crucial part of the audit. Such considerations also pertain outside a conventional financial context, for example when executing quality control checking of manufactured products, for example sensor data derived from testing manufactured products.

However, there currently exist several issues associated with obtaining audit evidence. As an example, sources of information having as diverse and comprehensive nature as that of audit evidence, are disparate and often distributed. Therefore, aggregating and systematically organising information from such information sources poses a significant challenge pertaining to data acquisition and data recording. Providing computing hardware that is specifically configured to be able to collate and process data from disparate and often distributed sources is a technical problem associated with known technical art. Such computing hardware for collating data from disparate and distributed sources has been the subject matter of numerous granted patents in the USA and Europe.

Presently, several analytical methods and conventional computing devices are being used for obtaining audit evidence. Such analytical methods include, but are not limited to, a regression analysis, a trend analysis, a ration analysis and reasonableness testing. Often, for example, a given auditor may employ the regression analysis for:

(i) estimating a sample size of the records that need to be analysed, from among an aggregate data of the records of the given establishment's financial and non-financial operations;

(ii) identifying misstatements within the records of the given establishment's financial and non-financial operations; and (iii) to obtain sufficient and appropriate audit evidence that the financial statements are free from material misstatements.

Specific adaptations of computing devices for performing such aforesaid auditing tasks (i) to (iii) represent a technical problem that is contemporarily inadequately addressed, wherein the auditing task is not limited merely to processing financial transactions, but includes manufacturing operations and construction operations.

Generally, the auditor performs the aforesaid analytical methods manually, based on judgment, which often leads to errors and inaccuracies in the audit planning and a low level of audit evidence since such analytical methods are cumbersome and calculation intensive; moreover, stochastic errors can also arise for various technical reasons in data that is provided for being processed pursuant to the analytical methods. Even when the auditor employs conventional computing hardware for performing the aforesaid analytical methods, the auditor has to undertake substantial manual effort for processing diverse items of disparate information. Furthermore, existing audit practices are unable to relate properly the regression analysis to statistical mechanisms of an audit risk model. Since the audit risk model is the backbone of the audit, the regression analysis is not optimally employed in current audit practices, mutatis mutandis to contemporary manufacturing practices.

Therefore, in light of the foregoing discussion, there exists a need to overcome the aforementioned drawbacks associated with audit planning methods and algorithms for obtaining audit evidence, for example from manufacturing environments, but not limited thereto; in particular, there is a need to provide computing systems that are specifically configured for implementing collection of audit evidence, wherein the computing systems are capable of identifying, and thus facilitates taking steps to correct, errors and distortions arising in data that is accumulated from a given environment, for example for auditing or quality assurance purposes.

SUMMARY

The present disclosure seeks to provide an improved system for processing distorted or inaccurate input data obtained from an environment, for example to take one or more steps to correct or reduce such distortions or inaccuracies, for example for purposes of auditing evidence but not limited thereto.

Moreover, the present disclosure seeks to provide an improved method for (of) processing distorted or inaccurate input data obtained from an environment, for example the method including executing one or more steps to correct or reduce such distortions or inaccuracies, for example for purposes of auditing evidence but not limited thereto.

Furthermore, the present disclosure also seeks to provide an improved software product for executing aforesaid improved methods.

The present disclosure seeks to provide a solution to the existing problem of errors and inaccuracies in audit planning and procedures to obtain audit evidence that are introduced on account of judgmental (namely, manual) implementation of cumbersome and calculation intensive analytical methods. An aim of the present disclosure is to provide a solution that overcomes at least partially the problems encountered in the prior art, and allows for implementing audit planning using specially adapted hardware systems in a reliable manner with high efficiency and accuracy, whilst reducing intensive calculation burden on an auditor.

In one aspect, an embodiment of the present disclosure provides a regression planning and evaluation system that processes distorted or inaccurate input data obtained from an environment, wherein the regression planning and evaluation system, when operated, obtains audit evidence by detecting distortions or inaccuracies of the input data, the regression planning and evaluation system being automated or semi-automated, characterized in that the regression planning and evaluation system comprises a server arrangement that is configured to:

(a) obtain input data pertaining to a given use case for which the audit evidence is to be obtained, the input data comprising data values of a set of variables for a plurality of samples associated with the given use case;

(b) validate the input data based on a predefined set of statistical rules;

(c) provide a user with an interactive user interface to enable the user to input a plurality of audit parameters to be employed for the audit evidence, the plurality of audit parameters comprising at least one of: an assurance level to be achieved, a tolerable error, a statistical sampling technique to be employed;

(d) generate a regression plot to be presented to the user via the interactive user interface and identify an upper acceptance bound and a lower acceptance bound to be indicated with respect to a regression line in the regression plot, the regression plot representing a variation of a target variable with respect to at least one explanatory variable, wherein the regression plot is to be generated for the plurality of samples, and wherein the upper acceptance bound and the lower acceptance bound are to be identified based on the plurality of audit parameters; and (e) identify, from amongst the plurality of samples, key items that are required to be tested, the key items being samples that fall outside the upper acceptance bound and the lower acceptance bound in the regression plot.

In another aspect, an embodiment of the present disclosure provides a method for (of) obtaining audit evidence, the method comprising using an automated or semi-automated regression planning and evaluation system that processes distorted or inaccurate input data obtained from an environment, wherein the regression planning and evaluation system, when operated, obtains audit evidence by detecting distortions or inaccuracies of the input data, the regression planning and evaluation system being automated or semi-automated, characterized in that the method includes:

(a) obtaining input data pertaining to a given use case for which the audit evidence is to be obtained, the input data comprising data values of a set of variables for a plurality of samples associated with the given use case;

(b) validating the input data based on a predefined set of statistical rules;

(c) providing a user with an interactive user interface to enable the user to input a plurality of audit parameters to be employed for the audit evidence, the plurality of audit parameters comprising at least one of: an assurance level to be achieved, a tolerable error, a statistical sampling technique to be employed;

(d) generating a regression plot to be presented to the user via the interactive user interface and identifying an upper acceptance bound and a lower acceptance bound to be indicated with respect to a regression line in the regression plot, wherein the regression plot represents a variation of a target variable with respect to at least one explanatory variable, the regression plot being generated for the plurality of samples, the upper acceptance bound and the lower acceptance bound being identified based on the plurality of audit parameters; and (e) identifying, from amongst the plurality of samples, key items that are required to be tested, the key items being samples that fall outside the upper acceptance bound and the lower acceptance bound in the regression plot.

In yet another aspect, an embodiment of the present disclosure provides a software product comprising a non-transitory machine-readable data storage medium having stored thereon program instructions that, when executed (namely accessed) by a processing device, cause the processing device to:

(a) obtain input data pertaining to a given use case for which an audit evidence is to be obtained, the input data comprising data values of a set of variables for a plurality of samples associated with the given use case;

(b) validate the input data based on a predefined set of statistical rules;

(c) provide a user with an interactive user interface to enable the user to input a plurality of audit parameters to be employed for the audit evidence, the plurality of audit parameters comprising at least one of: an assurance level to be achieved, a tolerable error, a statistical sampling technique to be employed;

(d) generate a regression plot to be presented to the user via the interactive user interface and identify an upper acceptance bound and a lower acceptance bound to be indicated with respect to a regression line in the regression plot, wherein the regression plot represents a variation of a target variable with respect to at least one explanatory variable, and wherein the regression plot is to be generated for the plurality of samples, further wherein the upper acceptance bound and the lower acceptance bound are to be identified based on the plurality of audit parameters; and (e) identify, from amongst the plurality of samples, key items that are required to be tested, the key items being samples that fall outside the upper acceptance bound and the lower acceptance bound in the regression plot.

The automated or semi-automated regression planning and evaluation system includes component parts that are specially adapted to perform regression computation in a computationally reasonable manner.

Embodiments of the present disclosure substantially eliminate or at least partially address the aforementioned problems in the prior art, and enables accurate and errorless audit planning by an auditor and whilst reducing calculation burden on the auditor.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1A:
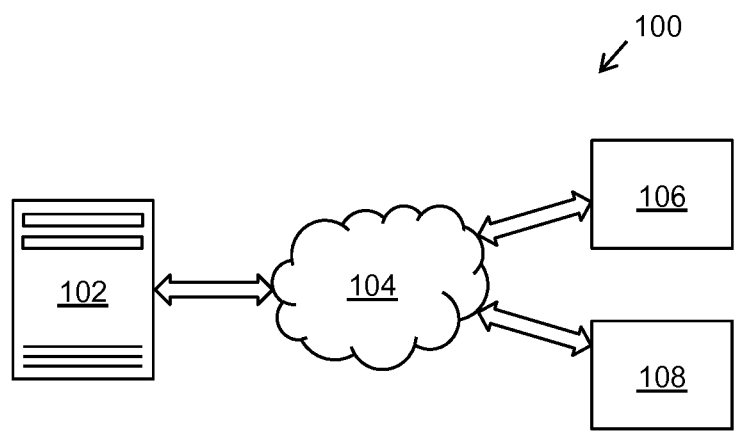
FIGS. 1A and 1B are schematic illustrations of a network environment wherein a system of the present disclosure is implemented, wherein the system employs regression planning and evaluation.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a regression planning and evaluation system that processes distorted or inaccurate input data obtained from an environment, wherein the regression planning and evaluation system, when operated, obtains audit evidence by detecting distortions or inaccuracies of the input data, the regression planning and evaluation system being automated or semi-automated, characterized in that the regression planning and evaluation system comprises a server arrangement that is configured to:

(a) obtain input data pertaining to a given use case for which the audit evidence is to be obtained, the input data comprising data values of a set of variables for a plurality of samples associated with the given use case;

(b) validate the input data based on a predefined set of statistical rules;

(c) provide a user with an interactive user interface to enable the user to input a plurality of audit parameters to be employed for the audit evidence, the plurality of audit parameters comprising at least one of: an assurance level to be achieved, a tolerable error, a statistical sampling technique to be employed;

(d) generate a regression plot to be presented to the user via the interactive user interface and identify an upper acceptance bound and a lower acceptance bound to be indicated with respect to a regression line in the regression plot, the regression plot representing a variation of a target variable with respect to at least one explanatory variable, wherein the regression plot is to be generated for the plurality of samples, and wherein the upper acceptance bound and the lower acceptance bound are to be identified based on the plurality of audit parameters; and (e) identify, from amongst the plurality of samples, key items that are required to be tested, the key items being samples that fall outside the upper acceptance bound and the lower acceptance bound in the regression plot In another aspect, an embodiment of the present disclosure provides a method for (of) obtaining audit evidence, the method comprising using an automated or semi-automated regression planning and evaluation system that processes distorted or inaccurate input data obtained from an environment, wherein the regression planning and evaluation system, when operated, obtains audit evidence by detecting distortions or inaccuracies of the input data, the regression planning and evaluation system being automated or semi-automated, characterized in that the method includes:

(a) obtaining input data pertaining to a given use case for which the audit evidence is to be obtained, the input data comprising data values of a set of variables for a plurality of samples associated with the given use case;

(b) validating the input data based on a predefined set of statistical rules;

(c) providing a user with an interactive user interface to enable the user to input a plurality of audit parameters to be employed for the audit evidence, the plurality of audit parameters comprising at least one of: an assurance level to be achieved, a tolerable error, a statistical sampling technique to be employed;

(d) generating a regression plot to be presented to the user via the interactive user interface and identifying an upper acceptance bound and a lower acceptance bound to be indicated with respect to a regression line in the regression plot, wherein the regression plot represents a variation of a target variable with respect to at least one explanatory variable, the regression plot being generated for the plurality of samples, the upper acceptance bound and the lower acceptance bound being identified based on the plurality of audit parameters; and (e) identifying, from amongst the plurality of samples, key items that are required to be tested, the key items being samples that fall outside the upper acceptance bound and the lower acceptance bound in the regression plot.

In yet another aspect, an embodiment of the present disclosure provides a software product comprising a non-transitory machine-readable data storage medium having stored thereon program instructions that, when accessed by a processing device, cause the processing device to:

(a) obtain input data pertaining to a given use case for which an audit evidence is to be obtained, the input data comprising data values of a set of variables for a plurality of samples associated with the given use case;

(b) validate the input data based on a predefined set of statistical rules;

(c) provide a user with an interactive user interface to enable the user to input a plurality of audit parameters to be employed for the audit evidence, the plurality of audit parameters comprising at least one of: an assurance level to be achieved, a tolerable error, a statistical sampling technique to be employed;

(d) generate a regression plot to be presented to the user via the interactive user interface and identify an upper acceptance bound and a lower acceptance bound to be indicated with respect to a regression line in the regression plot, wherein the regression plot represents a variation of a target variable with respect to at least one explanatory variable, and wherein the regression plot is to be generated for the plurality of samples, further wherein the upper acceptance bound and the lower acceptance bound are to be identified based on the plurality of audit parameters; and (e) identify, from amongst the plurality of samples, key items that are required to be tested, the key items being samples that fall outside the upper acceptance bound and the lower acceptance bound in the regression plot.

The present disclosure provides the aforementioned system, the aforementioned method, and the aforementioned software product of obtaining audit evidence. Beneficially, the method described herein allows for obtaining the audit evidence in a reliable manner and with high efficiency and accuracy, for example for detecting errors and distortions in input data acquire from an environment, for example acquired from a manufacturing facility, but not limited thereto. The method is implemented by way of using the regression planning and evaluation system; the system optionally functions in an automated manner or a semi-automated manner, or iterates between the automated manner and the semi-automated manner; by such operation, there is achieved a substantially reduced intensive calculation burden on a given user, for example an auditor). As a result of being implemented on powerful customized computing hardware, the method of obtaining audit evidence is quick and user-friendly. Furthermore, the automated or semi-automated regression planning and evaluation system provides customized processing functionality that enables efficient data aggregation from disparate information sources providing a wide spectrum of input data, as well as quick, systematic organisation of such a wide spectrum of input data. This increases a rate of data processing for the customized processing hardware as compared to conventional computing hardware. Notably, the customized processing hardware described herein processes an enormous amount of data in a very short time, thereby providing an extremely high data processing throughput. Moreover, said customized processing hardware efficiently and accurately implements the specialized processing steps of the aforementioned method. Furthermore, the regression analysis performed for obtaining the audit evidence can also be easily related to statistical mechanisms of an audit risk model, for audit procedures that are to be conducted by the user; use of a numerical vector model for removing data errors and distortions is also employed in a system described in a granted European patent EP0970463B1 ("Speech Analysis System", The Secretary of State for Defence) as aforementioned. Notably, the regression analysis is performed digitally using processing hardware, and can therefore be seamlessly integrated into digital solutions that are linked to the audit risk model. Therefore, by employing the automated or semi-automated regression planning and evaluation system, for example as aforementioned, the user's effort in obtaining audit evidence is considerably reduced. The regression analysis, for example, is implemented in a regression module that is added to the server arrangement (namely, a data processing arrangement), with corresponding software that operates to enable the regression module to exchange data with the data processing arrangement; for example, the regression module is implemented using field-programmable gate arrays (FPGA's) or custom-designed digital hardware (for example, implemented using one or more high-speed reduced instruction set (RISC) processors).

It will be appreciated that the aforesaid regression planning and evaluation system and the aforesaid method are not limited to obtaining the audit evidence for only a single use case, and can be employed to obtain audit evidences for a plurality of use cases (namely, multiple use cases); such a plurality of use cases, for example, relate to acquired sensor data from manufacturing facilities, data results from product testing systems, from mining facilities and such like. In such a case, the aforesaid steps (a) to (e) are implemented for each use case of the plurality of use cases.

The aforesaid method uses the automated or semi-automated regression planning and evaluation system for obtaining the audit evidence. In one embodiment, the regression planning and evaluation system is automated (namely, fully autonomous). In such a case, the user of the regression planning and evaluation system operates the regression planning and evaluation system in a manner that the aforesaid steps (a) to (e) are entirely implemented at the regression planning and evaluation system. In another embodiment, the regression planning and evaluation system is semi-automated (namely, semi-autonomous). In a first case, when the regression planning and evaluation system is semi-automated, the user of the regression planning and evaluation system operates the regression planning and evaluation system in a manner that at least one of the aforesaid steps (a) to (e) are implemented by the user. As an example, the step (a) may be performed manually by the user, and the user may input (namely, enter) such obtained input data, into the regression planning and evaluation system; however, it will be appreciated that the input data can derive from sensor systems, for example cameras, scanners, microphones and such like. In a second case, when the regression planning and evaluation system is semi-automated, the user of the regression planning and evaluation system manually verifies (namely, double checks) the key items identified by the regression planning and evaluation system.

Optionally, the user is a person having knowledge pertaining to at least one of: finance, accounting, business administration, auditing, product quality assurance, manufacturing production. Optionally, in this regard, the user is an independent auditor, an internal auditor employed by an entity being audited, or an auditor employed by at least one firm offering audit services. Such an auditor may or may not be certified by at least one regulatory authority of auditing.

Throughout the present disclosure, the term "server arrangement" relates to an arrangement of at least one server that, when operated, performs the aforementioned steps (a) to (e) to obtain the audit evidence. The term "server" generally refers to an application, program, process or device in a client-server relationship that responds to requests for information or services by another application, program, process or device (a client) on a communication network. The term "server" also encompasses software that makes the act of serving information or providing services possible. Moreover, the term "client" generally refers to an application, program, process or device in a client-server relationship that requests information or services from another application, program, process or device (the server) on the communication network. Importantly, the terms "client" and "server" are relative since an application may be a client to one application but a server to another application. The term "client" also encompasses software that makes the connection between a requesting application, program, process or device and a server possible, such as an FTP client.

It will be appreciated that the communication network can be an individual network, or a collection of individual networks that are interconnected with each other to function as a single large network. The communication network may be wired, wireless, or a combination thereof. Examples of the individual networks include, but are not limited to, Local Area Networks (LANS), Wide Area Networks (WANS), Metropolitan Area Networks (MANs), Wireless LANs (WLANs), Wireless WANs (WWANs), Wireless MANs (WMANs), the Internet, radio networks, telecommunication networks, and Worldwide Interoperability for Microwave Access (WiMAX) networks. It will be appreciated that the method of the present disclosure is beneficially capable of reconfiguring computing hardware implementing the method, for example in response to auditing tasks implemented by the computing hardware. For example, in an event of an error or distortion being found, the computing hardware activates a data collection module for acquiring more data from a manufacturing facility or a manufacturing database.

For illustration purposes only, there will now be considered an exemplary network environment, wherein the regression planning and evaluation system is implemented pursuant to embodiments of the present disclosure. One such network environment has been illustrated in conjunction with FIG. 1 as explained in more detail hereinafter. The exemplary network environment may include a source of the input data pertaining to the given use case, a user device associated with the user of the automated or semi-automated regression planning and evaluation system, the server arrangement including the at least one server, and the communication network. Notably, the server arrangement is coupled in communication with the source of the input data either directly, or via the communication network. Furthermore, in the exemplary network environment, the server arrangement may be coupled in communication with the user device via the communication network. In such a case, the user device can be understood to be the "client" for the server arrangement. It is to be noted here that the server arrangement could be coupled in communication with a plurality of user devices associated with a plurality of users. Examples of the user device include, but are not limited to, a mobile phone, a smart telephone, a Mobile Internet Device (MID), a tablet computer, an Ultra-Mobile Personal Computer (UMPC), a phablet computer, a Personal Digital Assistant (PDA), a web pad, a Personal Computer (PC), a handheld PC, a laptop computer, a tablet computer, a desktop computer, a custom data logger, a custom sensor arrangement with user-interface and so forth.

It will be appreciated that the aforementioned server arrangement can be implemented in several ways. In an example, the entire server arrangement could be directly coupled in communication with a given user device associated with a given user, via the communication network. In such a case, the entire server arrangement can be accessed by the given user using the given user device, via the communication network. In another example, the server arrangement could have a distributed architecture wherein the server arrangement could comprise a plurality of servers that are coupled in communication with a given user device associated with a given user, via the communication network. In such a case, there can be a first server (namely, a "front-end server") that is directly coupled in communication with the given user device, and at least one server (namely, at least one "back-end server") that is coupled in communication to the first server. In operation, the first server can be accessed by the given user using the given user device, via the communication network. Furthermore, in such a case, the at least one back-end server, either alone, or in combination with the front-end server, could implement the aforesaid steps (a) to (e). In yet another example, server arrangement could be implemented by way of a cloud server arrangement.

Optionally, the server arrangement is coupled to a regression module that is coupled in communication with the server arrangement for performing regression computations; the regression module is beneficially implemented using custom computing hardware that is reconfigurable depending on a type of regression being executed on the regression module. More optionally, the regression module is implemented by employing a configuration of field-programmable gate arrays (FPGA's) and reduced instruction set (RISC) computers. Therefore, the regression module can be understood to be a custom computing hardware that is configured to perform the regression computations described throughout the present disclosure. Notably, such a custom computing hardware is computationally efficient, thereby allowing the regression computations to be performed at a much faster than conventional computing hardware. Yet more optionally, the reduced instruction set (RISC) computers are reconfigured in response to a structure of data received thereat to be processed, allocating one or more regression computations to a given reduced instruction set (RISC) computer, and by performing correlations by way of data exchange between a plurality of the reduced instruction set (RISC) computers.

In an embodiment, the source of the input data is at least one entity device associated with an entity, the entity being associated with the given use case for which the audit evidence is to be obtained. Optionally, the entity is an organisation (namely, an establishment, a firm or a company) being audited. Examples of the at least one entity device include, but are not limited to, a mobile phone, a smart telephone, a Mobile Internet Device (MID), a tablet computer, an Ultra-Mobile Personal Computer (UMPC), a phablet computer, a Personal Digital Assistant (PDA), a web pad, a Personal Computer (PC), a handheld PC, a laptop computer, a tablet computer, and a desktop computer. In another embodiment, the source of the input data is a database arrangement comprising at least one database, the database arrangement being configured to store thereon, the input data pertaining to the given use case for which the audit evidence is to be obtained. Optionally, the database arrangement obtains the input data pertaining to the given use case for which the audit evidence is to be obtained, from the at least one entity device associated with the entity. In such a case, the database arrangement acts as a data repository whereat the input data is stored. It is to be understood that the term "database" generally refers to hardware, software, firmware, or a combination of these for storing information in an organized (namely, structured) manner, thereby, allowing for easy storage, access (namely, retrieval), updating and analysis of such information. The term "database" also encompasses database servers that provide the aforesaid database services to the automated or semi-automated regression planning and evaluation system.

At (a), the automated or semi-automated regression planning and evaluation system is used to obtain the input data pertaining to the given use case for which the audit evidence is to be obtained; the use case can be primarily a financial audit, but can be alternatively a manufacturing quality audit that involves collating diverse measured data, for example from ultrasonic testers, X-ray imaging apparatus, electronic test equipment, inspection cameras and so forth. In an embodiment, the server arrangement directly obtains the input data pertaining to the given use case, from the source of the input data. In another embodiment, the server arrangement indirectly obtains the input data pertaining to the given use case. In such a case, the user manually obtains the input data pertaining to the given use case, from the source of the input data, and subsequently inputs (namely, enters) the obtained input data into the server arrangement.

It will be appreciated that the automated or semi-automated regression planning and evaluation system can efficiently obtain the input data from disparate and distributed sources. Notably, said system is specifically configured to be able to collate and process the obtained input data in a meaningful, time-efficient manner.

The input data comprises the data values of the set of variables for the plurality of samples associated with the given use case. Notably, the input data relates to disaggregated data pertaining to the given use case, such disaggregated data including the data values of the set of variables for (i) a portion of an entire population of financial and non-financial records associated with the given use case, or (ii) the entire population of financial and non-financial records associated with the given use case.

As an example, if the entire population of financial and non-financial records associated with the given use case includes 1000 records (namely, 1000 samples), the input data may include the data values of the set of variables for (i) a portion of the entire 1000 records, for example, such as 350 records (namely, 350 samples), or (ii) the entire 1000 records (namely, 1000 samples). Furthermore, the set of variables can be understood to be attributes related to the given use case, and the data values of the set of variables provides financial and/or non-financial information related to the given use case. It will be appreciated that such disaggregated input data allows for substantially reducing computational burden on the automated or semi-automated regression planning and evaluation system.

As an example, a given use case UC may relate to sales for a given manufacturer. In such an example, the input data may relate to disaggregated data that includes data values of a set of eight variables V1-V8 for 30 shops at which items manufactured by the given manufacturer are sold. In other words, the input data may comprise the data values of the set of eight variables V1-V8 for 30 samples associated with the given use case. Furthermore, variable V1 may be rent, variable V2 may be sales, variable V3 may be selling area, variable V4 may be cost of sales, variable V5 may be inventory, variable V6 may be personnel cost, variable V7 may be total trade profit, and variable V8 may be number of customers. Moreover, the data values for a given variable, for example, such as the variable V2 may be £51,000; £94,000; £115,000; £103,000; £73,000; £101,500; £109,000; £84,000; £71,000; £118,000; £77,000; £61,500; £105,000; £95,000; £54,000; £121,500; £82,000; £52,000; £58,000; £98,000; £127,000; £88,000; £100,000; £112,000; £89,500; £100,000; £66,000; £125,000; £75,000; and £96,500. Similar data values (with or without units) may be obtained corresponding to other variables, for the 30 samples. However, it will be appreciated that embodiments of the present invention are not limited to financial transactions and can be used to process other types of data, for example material utilization, material quality, process energy consumption, quantity of manufacturing waste generated and so forth.

Optionally, in the automated or semi-automated regression planning and evaluation system, the server arrangement is configured to represent, via the interactive user interface, the obtained input data; for example, data memory banks of the server arrangement can be selectively activated or otherwise deployed depending on a nature of the input data; for example, input data that is accessed less frequently is stored in slower-access data memory whose power requirements are lower than faster-access data memory that is employed to store input data that is more frequently accessed. Throughout the present disclosure, the term "interactive user interface" relates to a space that allows for interaction between the user and the regression planning and evaluation system. Therefore, the term "interactive user interface" can also be referred to as a "human-machine interface". The interactive user interface is generally rendered on a display screen of the user device and allows for the automated or semi-automated regression planning and evaluation system to receive input(s) from and/or provide output(s) to the user. The aforesaid obtaining and representation of the input data can be understood to pertain to a regression planning operation that is associated with obtaining the audit evidence, and the representation of the obtained input data can be understood to pertain to regression planning information.

Optionally, at the interactive user interface, the obtained input data is represented in form of: a table, an image, or text.

It will be appreciated that the automated or semi-automated regression planning and evaluation system is configured to obtain an enormous amount of input data and systematically represent the obtained input data to the user via the interactive user interface in a concrete and useful form. Said obtained input data is represented to the user in a user-friendly manner. This allows the user to easily understand and draw logical inferences from the input data, which he/she would not be able to do mentally.

At (b), the automated or semi-automated regression planning and evaluation system is used to validate the input data based on a predefined set of statistical rules; the statistical rules can be implemented as mathematical algorithms, and are optionally selected depending on a structure of the input data depending on an artificial intelligence (AI) analysis of the input data. In such a case, the predefined set of statistical rules are employed to validate the input data according to at least one of following attributes: data type, data value, data structure, data consistency, data format, data accuracy, and data relevance. Data type can be found, for example, by flags or metadata accompanying the input data. The data values are determined, for example, by data analysis, wherein such analysis involves computing an average value, a data density as a function of data value and so forth. Data structure is determined, for example, by analysing a distribution of values as a function of a reference parameter, for example time of input data collection, location of input data collection, and so forth. Data accuracy is beneficially determined, for example, by performing one or more correlations as a function of a reference parameter, and then determining a differential of the one or more correlations as a function of the reference parameter. Data relevance is determined, for example, by performing a sensitivity analysis of changes in values of the input data relative to an analysis output provided by the system of the disclosure.

It will be appreciated that such validation of the input data allows for ensuring a planned precision level and a planned reliability level of the input data, prior to its processing for obtaining the audit evidence. Notably, the predefined set of statistical rules allow for pre-processing the input data by way of the aforesaid validation operation, in a manner that the input data has a certain level of quality and format that is appropriate for subsequent analysis of the input data for obtaining the audit evidence. Furthermore, such validation of the input data may also allow for reducing audit risk that is associated with known risk factors in generally accepted auditing practices. Therefore, validation of the input data is a highly beneficial pre-processing operation that is associated with obtaining the audit evidence. Furthermore, the pre-processing operation can be understood to pertain to the regression planning operation that is associated with obtaining the audit evidence. Therefore, it will be appreciated that the validated input data can be understood to pertain to the regression planning information.

As an example, the server arrangement may validate the input data based on a set of logical rules that prohibit any data value of any variable to be negative. In such an example, if all the data values of the set of variables for the plurality of samples are non-negative (namely, positive), the entire input data is understood to be validated as being correct and appropriate.

Optionally, the predefined set of statistical rules include at least one of: arithmetic rules, logical rules, syntax rules, semantic rules. As an example, an arithmetic rule may specify that data values of a given variable cannot exceed a predefined amount. As another example, a logical rule may specify that none of the data values of the set of variables should be empty. As another example, a syntax rule may specify that a given row of input data corresponding to a given sample associated with the given use case, should include only positive (namely, non-negative) data values of the set of variables for the given sample. As yet another example, a given semantic rule may specify that data values of a given variable must contain at least five characters.

Optionally, in the automated or semi-automated regression planning and evaluation system, the server arrangement is configured to enable the user to validate the input data, via the interactive user interface. Optionally, user validation is performed with assistance of an artificial intelligence (AI)

adaptive advisory model, for example configured by using teaching data derived from performing previous audits.

Alternatively, optionally, in the automated or semi-automated regression planning and evaluation system, the server arrangement is configured to (i) validate the input data based on the predefined set of statistical rules, and (ii) enable the user to validate the input data, via the interactive user interface. Such rules, for example, are elucidated in greater detail in the foregoing.

Optionally, in the automated or semi-automated regression planning and evaluation system, the server arrangement is configured to represent, via the interactive user interface, the validated input data. Optionally, in this regard, at the interactive user interface, the validated input data is represented in form of: a table, text, or an image.

Optionally, in the automated or semi-automated regression planning and evaluation system, the server arrangement is configured to enable, via the interactive user interface, the user to reconcile the validated input data to the source from where the input data was obtained at the step (a). In such a case, the user compares the validated input data with the input data stored at the source of the input data, to identify irregularities and inconsistencies therebetween. Beneficially, such a reconciliation operation allows for substantially reducing errors associated with incorrect obtaining of the input data (for example, errors such as duplication of data values within the input data, missing input data values, incorrect formatting of the input data, and the like) and errors associated with incorrect validation of the obtained input data (for example, such as incorrect data values, incorrect data value syntax, inappropriate data values, and the like). Therefore, the aforesaid reconciliation of the input data can be understood to be another pre-processing operation that is associated with obtaining the audit evidence. It will be appreciated that the aforesaid reconciliation operation may be implemented by the user only when the server arrangement enables the user to validate the input data, via the interactive user interface. In instances when the server arrangement validates the input data, the aforesaid reconciliation operation may be implemented automatically by the server arrangement.

It will be appreciated that the reconciliation operation is implemented using the customised processing hardware (namely, the regression module). The regression module is configured to efficiently and accurately perform reconciliation operation for a large amount of the input data in a very short time. Such accurate reconciliation operation is not possible manually and/or with conventional computing hardware.

Optionally, in the automated or semi-automated regression planning and evaluation system, the server arrangement is configured to represent, via the interactive user interface, a variable summary, wherein the variable summary facilitates the user to reconcile the validated input data to the source from where the input data was obtained at the step (a). Optionally, in this regard, at the interactive user interface, the variable summary is represented in form of: a table, text, or a list. Furthermore, the variable summary table can be understood to pertain to the regression planning information.

At (c), the automated or semi-automated regression planning and evaluation system is used to provide the user with the interactive user interface to enable the user to input the plurality of audit parameters to be employed for the audit evidence. Notably, the plurality of audit parameters act as a basis on which the validated input data is to be analysed (namely, evaluated) for obtaining the audit evidence.

Optionally, the automated or semi-automated regression planning and evaluation system enables the user to input the plurality of audit parameters by providing an input area at the interactive user interface. Optionally, in this regard, the input area comprises at least one of: a user-selectable icon, a user selectable button, an input field, a slider, a dropdown menu.

As mentioned previously, the plurality of audit parameters comprise at least one of: the assurance level to be achieved, the tolerable error, the statistical sampling technique to be employed. Throughout the present disclosure, the "assurance level" to be achieved for a given variable relates to a level of confidence that is to be achieved pertaining to accuracy of given data values of the given variable. Therefore, higher the assurance level to be achieved for the given variable, higher the confidence that is to be achieved pertaining to accuracy of given data values of the given variable. In other words, higher the assurance level to be achieved for the given variable, higher the confidence regarding absence of misstatements within the given data values of the given variable. Furthermore, throughout the present disclosure, the "tolerable error" relates to an acceptable amount (namely, measure) by which a given data value of a given variable can vary from its actual (namely, real or true) value, without considerably impacting the audit evidence. In other words, the tolerable error relates to a maximum acceptable error that can be associated with the given data value, without the given data value being considered as a misstatement. Moreover, throughout the present disclosure, the "statistical sampling technique to be employed" relates to a technique that is to be employed for obtaining remaining samples that are to be subsequently analysed for obtaining the audit evidence, from among the entire population of financial and non-financial records associated with the given use case. In one case, the remaining samples include the entire population of such financial and non-financial records. In another case, the remaining samples include only a given portion (namely, only a few records) of the entire population of such financial and non-financial records. Notably, the statistical sampling technique is to be employed on identification of the key items at (e). Examples of the statistical sampling technique to be employed include, but are not limited to, monetary unit sampling, attribute sampling, stratified sampling, variable sampling.

Optionally, the assurance level to be achieved is expressed as a percentage of assurance. In an embodiment, the assurance level to be achieved ranges from 0 percent assurance to 100 percent assurance. In such a case, the assurance level to be achieved could be, for example, 5, 10, 15, 20, 25, 30, 35, 40, 45, 50, 55, 60, 65, 70, 75, 80, 85, 90, 95 or 100 percent assurance. In another embodiment, the assurance level to be achieved ranges from 50 percent to 100 percent assurance. In such a case, the assurance level to be achieved could be, for example, 50, 55, 60, 65, 70, 75, 80, 85, 90, 95 or 100 percent assurance.

Optionally, the plurality of audit parameters further comprises a combined risk assessment for the given use case, the combined risk assessment comprising at least two of: an inherent risk associated with the given use case, a control risk associated with the given use case, a detection risk associated with the given use case.

Optionally, the plurality of audit parameters further comprises the target variable and the at least one explanatory variable.

At (d), the automated or semi-automated regression planning and evaluation system is used to generate the regression plot to be presented to the user via the interactive user interface and identify the upper acceptance bound and the lower acceptance bound to be indicated with respect to the regression line in the regression plot. The aforesaid generation of the regression plot can be understood to pertain to a regression evaluation operation that is associated with obtaining the audit evidence and the regression plot can be understood to pertain to regression evaluation information.

The regression plot represents the variation of the target variable with respect to the at least one explanatory variable. The regression plot is generated for the plurality of samples. In other words, the "regression plot" relates to a graphical representation depicting an impact of the at least one explanatory variable on the target variable, for the plurality of samples. Notably, the regression plot depicts a plurality of data points, wherein each data point corresponds to data values of the target variable and the at least one explanatory variable, for a given sample. Therefore, a number of the data points depicted in the regression plot is equal to a number of the plurality of samples associated with the given use case. In other words, the regression plot can be understood to depict the plurality of samples associated with the given use case.

Notably, the target variable and the at least one explanatory variable belong to the set of variables. It will be appreciated that the terms "target variable" and "explanatory variable" may also be referred to as an "output variable" and "input variable" respectively.

Optionally, the regression plot is an X/Y scatter plot wherein a given target variable is depicted along the Y axis and at least one given explanatory variable is depicted along the X axis. In such a case, each data point depicted in the X/Y scatter plot can be depicted as a coordinate point having coordinates (x, y) wherein 'x' is a given data value of the at least one explanatory variable and 'y' is a given data value of the target variable. Alternatively, optionally, the regression plot is an X/Y scatter plot wherein a given target variable is depicted along the X axis and at least one given explanatory variable is depicted along the Y axis. In such a case, each data point depicted in the X/Y scatter plot can be depicted as a coordinate point having coordinates (x, y) wherein 'x' is the given data value of the target variable and 'y' is the given data value of the at least one explanatory variable.

In an embodiment, a given regression plot illustrates a variation of a single target variable with respect to a single explanatory variable. In another embodiment, a given regression plot illustrates a variation of a single target variable with respect to a plurality of explanatory variables. In such a case, data points corresponding to data values of the target variable with respect to different explanatory variables have different appearance, thereby, enabling the user to easily differentiate therebetween. As an example, the data points corresponding to the data values of the target variable with respect to different explanatory variables may have different colours, different shapes, and/or different sizes.

Furthermore, the term "regression line" relates to a line that models the variation of the target variable with respect to the at least one explanatory variable. In other words, the regression line is understood to be a line that best fits (namely, closely represents) a distribution of the plurality of data points, in a manner that a cumulative distance of the plurality of data points from the regression line is minimum.

It will be appreciated that the regression line could be a straight line or a curve, for example a fitted Spline curve defined by a polynomial series, for example a quartic function, a logarithmic function, an exponential function, or any combination thereof. In one example embodiment, the regression line is a straight line having a form Y=(m*X)+C, when a given target variable (denoted as 'Y') varies linearly with a given explanatory variable (denoted as 'X'). In such a case, 'm' denotes a slope of the regression line and 'C' denotes an intercept (namely, a value of the target variable Y when the given explanatory variable X is equal to zero). In another instance, the regression line is a curve when a given target variable varies non-linearly with a given explanatory variable.

Moreover, the terms "upper acceptance bound" and "lower acceptance bound" relate to a maximum acceptable limit and a minimum acceptable limit of permissible misstatements within the plurality of samples respectively, that are acceptable while obtaining the audit evidence. Generally, when the input data associated with the given use case is employed for obtaining the audit evidence, a certain degree of error may be associated with the obtained audit evidence, and such error may also be propagated in subsequent audit procedures that are to be conducted based on the obtained audit evidence. Therefore, the upper acceptance bound and the lower acceptance bound are employed in order to accommodate for such possible errors. Specifically, the upper acceptance bound and the lower acceptance bound define an acceptance range (or an acceptance interval) therebetween, wherein samples that fall within (namely, lie within) the acceptance range, are considered acceptable for obtaining the audit evidence (namely, samples having none or an acceptable degree of error).

Furthermore, the upper acceptance bound (namely, an upper threshold) and the lower acceptance bound (namely, a lower threshold) are identified based on the plurality of audit parameters. In an example, the upper acceptance bound and the lower acceptance bound may be identified based on the tolerable error. In such an example case, the greater the tolerable error, the greater may be the acceptance range defined between the upper acceptance bound and the lower acceptance bound. In another example, the upper acceptance bound and the lower acceptance bound may be identified based on the assurance level to be achieved, for example quality assurance level associated with a manufacturing facility that is being audited for manufacturing quality. In such a case, greater the assurance level to be achieved smaller may be the acceptance range defined between the upper acceptance bound and the lower acceptance bound.

Optionally, in the automated or semi-automated regression planning and evaluation system, the server arrangement is configured to calculate the upper acceptance bound and the lower acceptance bound by employing at least one of: a mathematical formula, an artificial intelligence algorithm. Optionally, the mathematical formula is selected based on at least one of: input data type, input data structure, input data relevance. As an example, the following mathematical formula may be employed to calculate the upper acceptance bound and the lower acceptance bound:

$$\text{Upper acceptance bound} = \varphi + \gamma + k(\alpha)$$

$$\text{Lower acceptance bound} = \varphi - \gamma + k(\alpha)$$

wherein 'φ' denotes an audit value, 'γ' denotes a maximum possible deviation from a book value (namely, a maximum tolerable error), and 'k(α)' denotes a function of uncertainty α of the audit value φ.

Optionally, in the automated or semi-automated regression planning and evaluation system, the server arrangement is configured to present, at the interactive user interface, results of a calculation of the upper acceptance bound and the lower acceptance bound. Optionally, in this regard, at the interactive user interface, the aforesaid calculation of the upper and lower acceptance bounds is represented in a form of alphanumeric text or an image. The aforesaid calculation of the upper acceptance bound and the lower acceptance bound can be understood to pertain to the regression evaluation operation that is associated with obtaining the audit evidence and the calculated upper acceptance bound and lower acceptance bound can be understood to pertain to the regression evaluation information.

Optionally, in the automated or semi-automated regression planning and evaluation system, the server arrangement is configured to generate a plurality of regression plots to be presented to the user of the interactive user interface, wherein different regression plots illustrate a variation of the target variable with respect to different explanatory variables. Notably, the regression module allows for comprehensive data processing and visualization of the obtained input data, which aids the user to utilize the automated or semi-automated regression planning and evaluation system efficiently.

Optionally, in the automated or semi-automated regression planning and evaluation system, the server arrangement is configured to calculate a coefficient of determination associated with the regression plot, wherein the coefficient of determination pertains to a distribution of a given plurality of data points with respect to the regression line in the regression plot, and wherein a given data point corresponds to a given data value of the target variable and a given value of the at least one explanatory variable, for a given sample. Notably, the coefficient of determination associated with the regression plot can also be referred to as "R-squared measure". Furthermore, higher the value of the coefficient of determination, closer (namely, more accurate fitted) is the distribution of a given plurality of data points with respect to the regression line in the regression plot. Moreover, the coefficient of determination is generally expressed as a percentage, and therefore, its value ranges from 0% to 100%. The aforesaid determination of the coefficient of determination can be understood to pertain to the regression evaluation operation that is associated with obtaining the audit evidence and the calculated coefficient of determination can be understood to pertain to the regression evaluation information.

Optionally, in the automated or semi-automated regression planning and evaluation system, the server arrangement is configured to provide a variable input area at the interactive user interface, the variable input area enabling the user to input the target variable and the at least one explanatory variable that are to be employed for generating the regression plot, wherein the target variable and the at least one explanatory variable belong to the set of variables. Optionally, the variable input area comprises at least one of: a user-selectable icon, a user selectable button, an input field, a dropdown menu.

Alternatively, optionally, in the automated or semi-automated regression planning and evaluation system, the server arrangement is configured to automatically select the target variable and the at least one explanatory variable that are to be employed for generating the regression plot, wherein the target variable and the at least one explanatory variable belong to the set of variables. In such a case, the automatic selection could be a random selection, a default selection, or a selection by way of at least one artificial intelligence algorithm. Optionally, the automatic selection of target variable and the at least one explanatory variable that are to be employed for generating the regression plot, allows for providing a non-linear regression plot (namely, a regression plot having a curved regression line), a minimum number of key items that are required to be tested, and/or a minimum number of the remaining samples associated with the given use case that is to be subsequently analysed.

At (e), the automated or semi-automated regression planning and evaluation system is used to identify, from amongst the plurality of samples, key items that are required to be tested, the key items being samples that fall outside the upper acceptance bound and the lower acceptance bound in the regression plot. Notably, the term "key items" relates to samples (and specifically, data points corresponding to the samples) depicted in the regression plot that lie outside the acceptance range defined between the upper acceptance bound and the lower acceptance bound. It will be appreciated that such key items are considered to have substantial misstatement associated therewith, and may be considered to be inacceptable audit evidence by the user.

Optionally, whilst identifying the key items that are required to be tested at (e), the method comprises using the automated or semi-automated regression planning and evaluation system to distinctly depict the key items that are required to be tested and samples that fall within the upper acceptance bound and the lower acceptance bound in the regression plot. Optionally, in this regard, the automated or semi-automated regression planning and evaluation system employs colour-coding in a manner that a first colour is used to depict the key items that are required to be tested and a second colour is used to depict the samples that fall within the upper acceptance bound and the lower acceptance bound in the regression plot, the first colour being different from the second colour. It will be appreciated that such colour coding allows for the user to easily and correctly distinguish between the key items that are required to be tested, and the samples that need not be tested. As an example, a red colour may be used to depict the key items that are required to be tested and a yellow colour may be used to depict the samples that fall within the upper acceptance bound and the lower acceptance bound in the regression plot.

It will be appreciated that the aforesaid steps (a) to (e) are complex processing steps, which are efficiently implemented by the customized processing hardware (namely, the regression module) described herein. Said steps are implemented time efficiently to process an enormous amount of data, to efficiently identify misstatements for simplifying the process of obtaining audit evidence. In other words, such customized processing hardware can be understood to facilitate distortion (namely, misrepresentation) correction by identifying anomalies within the input data. Furthermore, the customized processing hardware is not limited to use in financial domain only and can be employed for data acquisition, recording and processing in various domains (for example, such as healthcare, telecommunication, information technology, and the like) for data acquisition and data recording.

Optionally, an identification of the key parameters (namely, the key items) performed by the system causes to system to acquire further input data to resolve distortions or inaccuracies associated with the key items, wherein the further data is obtained from at least one of: manual data entry, sensor signals, equipment measurements, image capture, database access.

Optionally, in the automated or semi-automated regression planning and evaluation system, the server arrangement is configured to present, at the interactive user interface, a calculation of the key items that are required to be tested, based on the upper acceptance bound and the lower acceptance bound. Optionally, in this regard, at the interactive user interface, the aforesaid calculation of the key items is represented in form of alphanumeric text or an image. Furthermore, the calculated key items that are required to be tested can be understood to pertain to the regression evaluation information.

Optionally, in the automated or semi-automated regression planning and evaluation system, the server arrangement is configured to present, at the interactive user interface, a number of the key items that are required to be tested. In such a case, the number of the key items that are required to be tested can be considered to be an output presented to the user by the automated or semi-automated regression planning and evaluation system.

Optionally, in the automated or semi-automated regression planning and evaluation system, the server arrangement is configured to calculate the number of the remaining samples associated with the given use case that are to be subsequently analysed for obtaining the audit evidence, based on at least one of: (i) the plurality of audit parameters, (ii) the identified key items at (e). It will be appreciated that lesser the total amount of key items of identified key items at (e), lesser the number of misstatements and inaccuracies in the obtained audit evidence, greater is the reliability of the obtained audit evidence associated with the plurality of samples, and smaller is the remaining sample size to be subsequently analysed for obtaining the audit evidence. The aforesaid calculation of the number of remaining samples associated with the given use case that are to be analysed can be understood to pertain to the regression evaluation operation that is associated with obtaining the audit evidence. Furthermore, such a calculation of the number of remaining samples associated with the given use case that are to be analysed, can be understood to pertain to the regression evaluation information. Optionally, the aforesaid number of remaining samples that are to be analysed, is presented to the user, via the interactive user interface. In such a case, the number of remaining samples (within the entire population of financial and non-financial records associated with the given use case) can be considered to be an output presented to the user by the automated or semi-automated regression planning and evaluation system.

It will be appreciated that when the remaining sample size to be analysed for obtaining the audit evidence is small, computing memory required to analyse such remaining samples is substantially reduced. Moreover, the regression module consumes less power for the analysis of the remaining sample size.

Optionally, in the automated or semi-automated regression planning and evaluation system, the server arrangement is configured to:
  enable, via the interactive user interface, the user to adjust the assurance level to be achieved and/or the tolerable error for the audit evidence and/or request further input data to be acquired to correct for errors or distortions in the input data, to improve an analysis of the input data provided; and
  iteratively perform the steps (d) and (e) for the adjusted assurance level and/or the adjusted tolerance error. It will be appreciated that such a manner of using the automated or semi-automated regression planning and evaluation system allows for the user to find a combination of audit parameters and key items that are suitable (namely, appropriate) according to his/her audit strategy. Notably, the user may adjust the assurance level to be obtained and/or the tolerable error until he/she is satisfied with a quality of the obtained audit evidence. When the user adjusts the assurance level and/or the tolerable error for the audit evidence, the upper acceptance bound and the lower acceptance bound which are based on such audit parameters, also change. As a result, the generated regression plot to be presented to the user also changes, leading to a subsequent change in key items that are required to be tested. Furthermore, optionally, the aforesaid adjustment of the assurance level to be achieved and/or the tolerable error allows for the user to find a suitable number of the remaining samples to be analysed.

It will be appreciated that the server arrangement is configured to enable the user to adjust the assurance level to be achieved and/or the tolerable error for the audit evidence very easily. Moreover, the server arrangement is configured to represent an effect of said adjustment of the assurance level to be achieved and/or the tolerable error for the audit evidence over the input data, thereby allowing to analyse the enormous input data in a very short time. On the other hand, if the user were to perform said steps manually after each adjustment of the assurance level to be achieved and/or the tolerable error for the audit evidence, he/she would spend considerable amount of time and effort. Moreover, such manual computations would be prone to errors and inaccuracies.

Optionally, when the user increases the assurance level to be obtained, on iteratively performing the steps (d) and (e) for the adjusted assurance level, the upper acceptance bound and the lower acceptance bound are changed in a manner that the acceptance range defined between the upper acceptance bound and the lower acceptance bound decreases. As a result, a number of the key items that are required to be tested increases. Conversely, when the user decreases the assurance level to be obtained, on iteratively performing the steps (d) and (e) for the adjusted assurance level, the upper acceptance bound and the lower acceptance bound are changed in a manner that the acceptance range defined between the upper acceptance bound and the lower acceptance bound increases. As a result, the number of the key items that are required to be tested decreases. Therefore, it will be appreciated that there may exist (i) an inverse relationship between the assurance level to be obtained and the acceptance range; and (ii) a direct relationship between the assurance level and the number of the key items that are required to be tested.

Optionally, when the user increases the tolerable error, on iteratively performing the steps (d) and (e) for the adjusted tolerable error, the upper acceptance bound and the lower acceptance bound are changed in a manner that the acceptance range defined between the upper acceptance bound and the lower acceptance bound increases. As a result, the number of the key items that are required to be tested decreases; in other words, a degree of stochastic uncertainty present in the input data is effectively reduced by such an approach to data processing. Conversely, when the user decreases the tolerable error, on iteratively performing the steps (d) and (e) for the adjusted tolerable error, the upper acceptance bound and the lower acceptance bound are changed in a manner that the acceptance range defined between the upper acceptance bound and the lower acceptance bound decreases. As a result, the number of the key items that are required to be tested increases. Therefore, it will be appreciated that there may exist (i) a direct relationship between the tolerable error and the acceptance range;

and (ii) an indirect relationship between the tolerable error and the number of the key items that are required to be tested.

Optionally, when the user increases both the assurance level to be obtained and the tolerable error, on iteratively performing the steps (d) and (e) for the adjusted assurance level and the tolerable error, the upper acceptance bound and the lower acceptance bound are changed according to a mathematical function. Optionally, in this regard, the mathematical function is to be employed for determining the upper acceptance bound and the lower acceptance bound, based on weights assigned to the assurance level to be obtained and the tolerable error in the mathematical function.

Optionally, the user adjusts the assurance level to be achieved and/or the tolerable error for the audit evidence by way of the input area (that is provided at the interactive user interface for enabling the user to input the plurality of audit parameters).

Optionally, the user adjusts the assurance level to be achieved and/or the tolerable error, based on data values of the target variable and the at least one explanatory variable.

Optionally, in the automated or semi-automated regression planning and evaluation system, the server arrangement is configured to provide an optimisation option in the interactive user interface that, when selected by the user, optimises the plurality of audit parameters in a manner that a number of total items comprising the number of identified key items and the number of remaining samples that are required to be tested, is reduced. Notably, the optimisation option finds an optimal combination of the plurality of audit parameters that allow for generating an optimal regression plot having a minimum number of the total items. Optionally, the optimisation option also allows for generating the non-linear regression plot. It will be appreciated that such an optimisation option facilitates the user to conveniently obtain a satisfactory quality of audit evidence. Optionally, on selection of the optimisation option by the user, the automated or semi-automated regression planning and evaluation system implements the steps (d) and (e) for multiple combinations of the plurality of audit parameters to identify different combinations of key items and the remaining samples corresponding to each combination of the plurality of different audit parameters. Therefore, a combination of the plurality of audit parameters associated with a minimum number of key items and the remaining samples is selected as the optimal combination of the plurality of audit parameters. Optionally, the optimisation option is provided by way of at least one of: a user-selectable icon, a user selectable button, a dropdown menu.

It will be appreciated that when the user uses the optimization option, the regression module rapidly performs complex computations, thereby substantially reducing a time that would be required if said computations were to be performed manually. Moreover, the regression module is configured to accurately perform said computations.

Optionally, in the automated or semi-automated regression planning and evaluation system, the server arrangement is configured to determine relationships existing between the variables of the set. It will be appreciated that there exist several relationships between the variables of the set, and often, such relationships may not be perceivable and/or quantifiable by merely viewing the validated input data. Such relationships existing between the variables of the set may be subsequently evaluated and analysed by the user to obtain the audit evidence. Notably, such a determination of the relationships existing between the variables of the set pertains to the regression planning operation associated with obtaining the audit evidence. Furthermore, the target variable and the at least one explanatory variable that are to be employed for generating the regression plot are optionally based on the determined relationships existing between the variables of the set. Optionally, in this regard, the target variable and the at least one explanatory variable have a high degree of relationship (namely, a strong relationship) therebetween; in other words, there exists a high degree of correlation. In such a case, the generated regression plot of the target variable and the at least one explanatory variable represents the relationship therebetween, to the user.

Optionally, in the automated or semi-automated regression planning and evaluation system, the server arrangement is configured to calculate correlation coefficients between the variables of the set, to determine the relationships existing therebetween the variables of the set. In such a case, the calculated value of a given correlation coefficient between two given variables of the set ranges from −1 to +1. Notably, greater an absolute value of the given correlation coefficient, greater is a degree (namely, magnitude) of relationship between the two given variables. Furthermore, a positive correlation coefficient indicates a direct relationship between the two given variables whereas a negative correlation coefficient indicates an inverse relationship between the two given variables. Notably, such a calculation of correlation coefficients pertains to the regression planning operation associated with obtaining the audit evidence. Furthermore, the calculated correlation coefficients can be understood to pertain to the regression planning information.

As an example, for the aforesaid given use case UC having the set of eight variables V1-V8 pertaining thereto, a correlation coefficient between the variables V2 (sales) and V3 (selling area) may be calculated to be equal to +0.3, whereas correlation coefficient between the variables V2 (sales) and V8 (number of customers) may be calculated to be equal to +0.7. Therefore, whilst the variable V2 is directly related to both the variables V3 and V8, the variable V2 has a higher degree of relationship (namely, a stronger relationship) with the variable V8 as compared to the variable V3.

Optionally, in the automated or semi-automated regression planning and evaluation system, the server arrangement is configured to:
enable, via the interactive user interface, the user to select a variable of interest from the set of variables;
determine an impact of remaining variables of the set on the variable of interest, based on the relationships existing between the variables; and
represent, via the interactive user interface, the impact of the remaining variables on the variable of interest. In such a case, the "variable of interest" can be any given variable among the set of variables, whose relationships with other remaining variables of the set are to be analysed by the user. Notably, a given remaining variable is said to have a high impact on the variable of interest if there is a strong relationship between the given remaining variable and the variable of interest. Optionally, the impact of remaining variables of the set on the variable of interest is directly proportional to the calculated correlation coefficients between the variable of interest and the remaining variables of the set. As an example, in the aforesaid example describing the given use case UC having the set of eight variables V1-V8 pertaining thereto, the calculated correlation coefficient between the variables V2 (sales) and V3 (selling area) is equal to +0.3, whereas the calculated correlation coefficient between the variables V2 and V8 (number of customers) is equal to +0.7. In such an example, the variable V2 can be considered to be the variable of interest and the variables V3 and V8 can be considered as the remaining variables of the set of eight variables V1-V8. Therefore, in such a case, an impact of the variable V3 on the variable V2 may be lesser than an impact of the variable V8 on the variable V2.

Optionally, the user selects the variable of interest from the set of variables via a variable of interest selector, the variable of interest selector being implemented by at least one of: a user-selectable icon, a user selectable button, an input field, a dropdown menu. Furthermore, the selected variable of interest can be understood to pertain to the regression planning information.

Optionally, at the interactive user interface, the impact of the remaining variables on the variable of interest is represented by way of a solar correlation representation, the solar correlation representation depicting the variable of interest to be arranged at a centre of the solar correlation representation, and a plurality of concentric orbits around the variable of interest, wherein each of the plurality of concentric orbits represents a distinct correlation coefficient, and wherein a given remaining variable is arranged in an orbit based on a given correlation coefficient between the given remaining variable and the variable of interest. Such a representation allows human visual interpretation to be enhanced on account of the user's mind being adapted to process visual information; optionally, an artificial intelligence (AI) engine is trained to perform such analysis in example embodiments of the present disclosure. In such a case, the plurality of concentric orbits generally represent absolute values of correlation coefficients. It will be appreciated that in such a case, a specific remaining variable can be arranged in only one orbit, whereas a given orbit representing a given correlation coefficient may depict zero, single, or multiple remaining variables therein. Notably, the given orbit may depict only those remaining variables therein that are associated with the variable of interest according to the given correlation coefficient. Furthermore, the aforesaid representation of the impact of the remaining variables on the variable of interest by way of the solar correlation representation pertains to the regression planning operation associated with obtaining the audit evidence. Moreover, the solar correlation representation can be understood to pertain to the regression planning information.

Optionally, the plurality of concentric orbits are arranged around the variable of interest in a manner that a distance of a given orbit from the variable of interest is inversely proportional to its corresponding correlation coefficient. In other words, a first orbit representing a first correlation coefficient is arranged farther away from the variable of interest as compared to a second orbit representing a second correlation coefficient, if the first correlation coefficient is smaller than the second correlation coefficient.

In an embodiment, eleven concentric orbits are arranged around the variable of interest, wherein the eleven concentric orbits represent 1, 0.9, 0.8, 0.7, 0.6, 0.5, 0.4, 0.3, 0.2, 0.1 and 0 correlation coefficients. In another embodiment, ten concentric orbits are arranged around the variable of interest, wherein the ten concentric orbits represent 0.9, 0.8, 0.7, 0.6, 0.5, 0.4, 0.3, 0.2, 0.1 and 0 correlation coefficients. In yet another embodiment, five concentric orbits are arranged around the variable of interest, wherein the five concentric orbits represent 0.8, 0.6, 0.4, 0.2 and 0 correlation coefficients. As an example, in the aforesaid example describing the given use case UC having the set of eight variables V1-V8 pertaining thereto, the variable V2 may be the variable of interest and the variables V1, V3, V4, V5, V6, V7 and V8 may be the remaining variables of the set of eight variables V1-V8 having correlation coefficients 0, 0.3, 0.9, 0.5, 0.9, 0.9 and 0.7 respectively, with respect to the variable of interest V2. In such a case, a solar correlation representation SOL pertaining to the given use case UC may represent the variable V2 arranged at a centre of the solar correlation representation SOL, and ten concentric orbits arranged around the variable V2. Therefore, the variable V1 may be arranged in an orbit representing 0 correlation coefficient, the variable V3 may be arranged in an orbit representing 0.3 correlation coefficient, the variable V5 may be arranged in an orbit representing 0.5 correlation coefficient, the variable V8 may be arranged in an orbit representing 0.7 correlation coefficient, and the variables V4, V6 and V7 may be arranged in an orbit representing 0.9 correlation coefficient. It will be appreciated that in such an example, the orbits representing 0.1, 0.2, 0.4, 0.6 and 0.8 correlation coefficients, are empty.

Optionally, selection of the target variable and the at least one explanatory variable that are to be employed for generating the regression plot, is based on the impact of the remaining variables on the variable of interest, wherein the target variable is the variable of interest and the at least one explanatory variable is selected from amongst the remaining variables of the set. As an example, the user may select a given variable of interest as the target variable and at least one given remaining variable from amongst the remaining variables of the set, wherein the at least one given remaining variable is arranged in one or more concentric orbits, for example a plurality of orbits, arranged close to the variable of interest, for generating the regression plot.

Optionally, in the automated or semi-automated regression planning and evaluation system, the server arrangement is configured to represent, via the interactive user interface, inter-relations that exist between the remaining variables. Optionally, in such a case, the inter-relations that exist between the remaining variables are represented by way of the solar correlation representation. Notably, an arrangement of the remaining variables in the solar correlation representation represents the inter-relations that exist between such remaining variables.

Optionally, in the solar correlation representation, an arrangement of the remaining variables about the variable of interest represents the inter-relations that exist between the remaining variables. Notably, variables lying on opposite sides of the variable of interest may not be inter-related whereas variables lying on the same side of the variable of interest may be inter-related. It will be appreciated that such a manner of representing the inter-relations that exist between the remaining variables is not limited to representing inter-relations of variables lying on a same orbit only, but can also be employed for representing inter-relations of variables lying on separate orbits.

Optionally, for a plurality of remaining variables that are arranged on a same orbit of the solar correlation representation, a distance (namely, a separation) between the plurality of remaining variables is directly proportional to a degree (namely, a strength) of inter-relations that exist therebetween. As an example, three variables X1, X2 and X3 may be arranged on a single orbit, wherein the variables X1 and X3 may be arranged close to each other, and substantially away from the variable X2. In such an example, (i) the variables X1 and X3 may have a strong inter-relation there between, (ii) the variables X1 and X2 may have a weak inter-relation there between, and (iii) the variables X3 and X2 may have a weak inter-relation there between.

Optionally, in the automated or semi-automated regression planning and evaluation system, the server arrangement is configured to represent, via the interactive user interface, a distribution of the data values of the variable of interest. It will be appreciated that provision of the aforesaid distribution of the data values of the variable of interest, allows for the user to understand and analyse the variable of interest in a user-friendly manner. Notably, such efficient and beneficial analysis of the distribution of the data values of the variable of interest pertains to the regression planning operation associated with obtaining the audit evidence.

Optionally, at the interactive user interface, the distribution of the data values of the variable of interest is represented in form of: a histogram, a bar graph, or a pie chart. Furthermore, the distribution of the data values of the variable of interest can be understood to pertain to the regression planning information.

Optionally, in the automated or semi-automated regression planning and evaluation system, the server arrangement is configured to:
enable, via the interactive user interface, the user to select, from amongst the set of variables, the target variable and a plurality of explanatory variables;
determine an impact of the plurality of explanatory variables on the target variable, based on the relationships existing between the variables; and
represent, via the interactive user interface, a residual plot indicative of the impact of the plurality of explanatory variables on the target variable. The "residual plot" relates to a graphical illustration of errors (namely, residuals) depicted in the regression plot with respect to predictions depicted in the regression plot. Furthermore, the residual plot is generated for the plurality of samples. Notably, the "predictions depicted in the regression plot" relate to predicted (namely, expected) values of the plurality of samples, wherein such predicted values of the plurality of samples lie along the regression line. Furthermore, the "errors depicted in the regression plot" relates to differences between an actual depiction of the plurality of samples (namely, data points) in the regression plot and the predicted values of the plurality of samples that lie along the regression line. It will be appreciated that if a given sample in the regression plot is actually depicted to lie along the regression line, an error associated with such a sample is zero. In other words, the residual plot depicts unexplained differences within the regression model, for each of the plurality of samples depicted in the regression plot. Optionally, the residual plot is used to acquire more input data associated with the differences in the regression model, for example retesting parts in manufacturing, measuring material compositions, generating further X-ray images of manufactured components and so forth.

Optionally, in the automated or semi-automated regression planning and evaluation system, the server arrangement is configured to:
identify an upper error bound and a lower error bound to be indicated with respect to a zero-error line in the residual plot, the upper error bound being identified based on a difference between the upper acceptance bound and the regression line, and the lower error bound being identified based on a difference between the lower acceptance bound and the regression line; and
identify, from amongst the plurality of samples, key items that are required to be tested, the key items being samples that fall outside the upper error bound and the lower error bound in the regression plot. It will be appreciated that a number of the key items identified using the residual plot may or may not be same as a number of the key items identified using the regression plot. Furthermore, it will be appreciated that identified key items using the residual plot and the identified key items using the regression plot may or may not be different.

Optionally, in the automated or semi-automated regression planning and evaluation system, the server arrangement is configured to determine a cumulative coefficient of determination associated with the residual plot, wherein the cumulative coefficient of determination is based on coefficients of determination associated with the plurality of explanatory variables.

Optionally, in the automated or semi-automated regression planning and evaluation system, the server arrangement is configured to perform influence diagnostics operations, based on or independent from the identified key items at (e). The influence diagnostics operations relate to identification of at least one influential key item from amongst the identified key items at (e) and analysis of the at least one influential key item. Optionally, performing the influence diagnostics operations comprises: calculating influence of the at least one influential key item, generating an influence table, employing an influence filter, generating an influence scatter plot. In such a case, the influential key item(s), the influence table, the influence filter, and the influence scatter plot can be understood to pertain to influence diagnostics information.

Optionally, a given influence scatter plot represents an influence of the at least one explanatory variable on the target variable, wherein the influence scatter plot is generated for the plurality of samples associated with the given use case, based on the regression plot. Notably, such an influence scatter plot depicts the influence on one axis (for example, its vertical axis) and an index of samples on another axis (for example, its horizontal axis). It will be appreciated that samples having a large influence associated therewith, can introduce a significant bias into the aforesaid regression analysis. Optionally, in an event that such a scatter plot has a spread that exceeds a given threshold, or plurality of thresholds defining a range, the system indicates that additional input data is required, for example from measurement devices in a manufacturing facility; by such an approach, errors or distortions can be reduced.

Optionally, the influence filter enables the user to select an influence range for the influence scatter plot, and the at least one output interface element further enables the regression planning and evaluation system to present the influence scatter plot iteratively to the user, for the adjusted influence range. The influence filter can be implemented by way of at least one of a user-selectable object, an input field, a slider, a dropdown menu and so forth. Notably, the "influence range" relates to an acceptable range of influence values that can be associated with the plurality of samples, without substantially impacting the audit evidence. In other words, samples having influence values that lie within the influence range, are considered to have acceptable amount of influence on the aforesaid regression analysis.

Optionally, the influence diagnostics information is a part of the regression evaluation information.

The present disclosure also relates to the method as described above. Various embodiments and variants disclosed above apply mutatis mutandis to the method.

Optionally, the method further comprises arranging for the server arrangement to be coupled to a regression module coupled in communication with the server arrangement for performing regression computations.

Optionally, the method further comprises arranging for the regression module to be implemented by employing a configuration of field-programmable gate arrays (FPGA's) and reduced instruction set (RISC) computers. Optionally, the regression module includes a plurality of types of data storage, wherein the types of data storage are reconfigured dynamically in response to data being processed through the regression module, wherein faster memory is allocated to store data that is frequently accessed by the regression module, and slower memory is allocated to store data that is infrequently accessed. For example, faster memory is implemented using solid-state memory devices, whereas slower memory is implemented using mechanical hard disc drives.

Optionally, the method includes implementing the reduced instruction set (RISC) computers to be reconfigurable in response to a structure of data received thereat to be processed, allocating one or more regression computations to a given reduced instruction set (RISC) computer, and by performing correlations by way of data exchange between a plurality of the reduced instruction set (RISC) computers.

Optionally, the method further comprises using the automated or semi-automated regression planning and evaluation system for:
enabling, via the interactive user interface, the user to adjust the assurance level to be achieved and/or the tolerable error or distortion for the audit evidence; and
iteratively performing the steps (d) and (e) for the adjusted assurance level and/or the adjusted tolerance error and/or distortion level.

Optionally, the method further comprises using the automated or semi-automated regression planning and evaluation system for providing an optimisation option in the interactive user interface that, when selected by the user, optimises the plurality of audit parameters in a manner that the number of key items that are required to be tested is reduced.

Optionally, the method further comprises using the automated or semi-automated regression planning and evaluation system for enabling, via the interactive user interface, the user to reconcile the validated input data to a source from where the input data was obtained at the step (a).

Optionally, the method further comprises using the automated or semi-automated regression planning and evaluation system for determining relationships existing between the variables of the set.

Optionally, the method further comprises using the automated or semi-automated regression planning and evaluation system for:
enabling, via the interactive user interface, the user to select a variable of interest from the set of variables;
determining an impact of remaining variables of the set on the variable of interest, based on the relationships existing between the variables; and
representing, via the interactive user interface, the impact of the remaining variables on the variable of interest.

Optionally, the method further comprises using the automated or semi-automated regression planning and evaluation system for representing, via the interactive user interface, inter-relations that exist between the remaining variables.

Optionally, the method further comprises using the automated or semi-automated regression planning and evaluation system for:
enabling, via the interactive user interface, the user to select, from amongst the set of variables, the target variable and a plurality of explanatory variables;
determining an impact of the plurality of explanatory variables on the target variable, based on the relationships existing between the variables; and
representing, via the interactive user interface, a residual plot indicative of the impact of the plurality of explanatory variables on the target variable.

Optionally, in the software product, the program instructions, when accessed by the processing device, cause the processing device to:
enable, via the interactive user interface, the user to adjust the assurance level to be achieved and/or the tolerable error for the audit evidence; and
iteratively perform (d) and (e) for the adjusted assurance level and/or the adjusted tolerance error.

DETAILED DESCRIPTION OF THE DRAWINGS

Figure 1B:
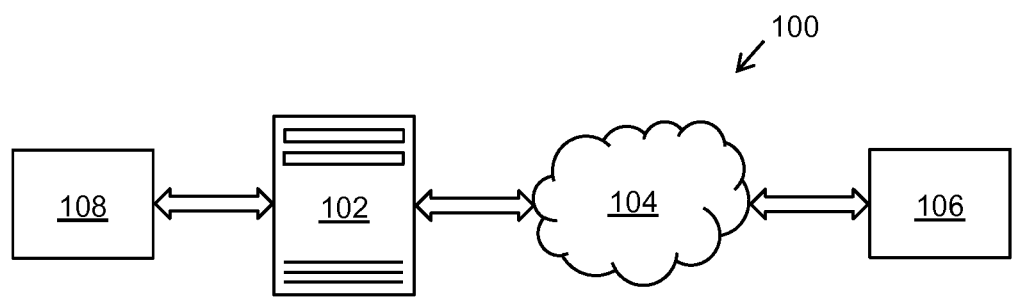

Referring to FIGS. 1A and 1B, there are shown therein schematic illustrations of a network environment 100, wherein a regression planning and evaluation system is implemented, in accordance with different embodiments of the present disclosure. The network environment 100 includes: a server arrangement 102 including at least one server, a communication network 104, a user device 106 associated with a user of the automated or semi-automated regression planning and evaluation system, and a source 108 of input data; the server arrangement 102 beneficially includes a regression module implemented using hardware that is especially configured to perform regression computations, for example implemented using custom-designed digital hardware, such as FPGA's and an array of RISC processors; for example, each RISC processor is configured and managed to executes an associated one or more complete regression calculations, so that multiple regression computations are executed temporally in parallel. The RISC processors are able, for example, to exchange information between them to make computations of correlations therein more efficient when computing regressions. As shown, in the network environment 100, the server arrangement 102 is coupled in communication with the user device 106 via the communication network 104.

In FIG. 1A, the server arrangement 102 is coupled in communication with the source 108 of the input data via the communication network 104.

In FIG. 1B, the server arrangement 102 is directly coupled in communication with the source 108 of the input data.

It will be appreciated that FIG. 1 is merely an example, which should not unduly limit the scope of the claims herein. It is to be understood that the specific designation for the network environment 100 is provided as an example and is not to be construed as limiting the network environment 100 to specific numbers, types, or arrangements of user devices, servers, sources of input data, and communication networks. A person skilled in the art will recognize many variations, alternatives, and modifications of embodiments of the present disclosure.

Figure 2:
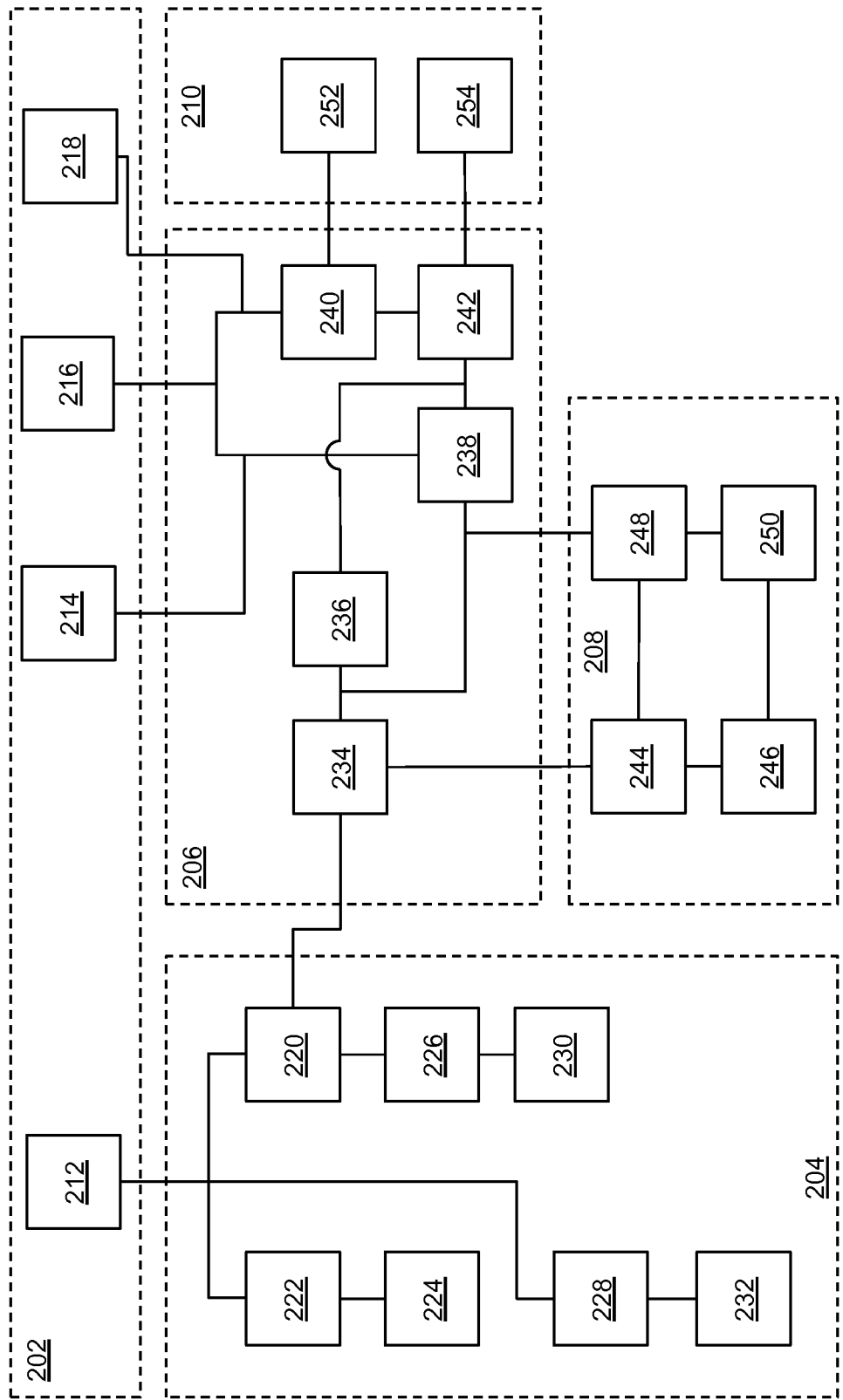
FIG. 2 is an illustration of exemplary input data obtained from an environment, wherein the input data is subject to algorithms for generating regression planning information, regression evaluation information, influence diagnostics information and outputs pertaining to a regression planning and evaluation system, in accordance with an embodiment of the present disclosure.

Referring to FIG. 2, there is shown an illustration of exemplary inputs 202 (including input data, for example measurement data from a manufacturing facility), regression planning information (data) 204, regression evaluation information (data) 206, influence diagnostics information (data) 208, and outputs (data) 210 pertaining to a regression planning and evaluation system, in accordance with an embodiment of the present disclosure.

The inputs 202 pertaining to the regression planning and evaluation system comprise: input data 212 pertaining to a given use case for which the audit evidence is to be obtained (for example, including sensor data, measurement data and such like from a manufacturing facility), and a plurality of audit parameters to be employed for the audit evidence. The plurality of audit parameters (for example, thresholds, ranges and such like) comprise: a tolerable error 214, an assurance level 216 to be achieved, and a combined risk assessment 218 for the given use case.

The regression planning information 204 comprises: a representation 220 of obtained input data 212, validated input data 222, a variable summary table 224, calculated correlation coefficients 226, selected variable of interest 228, a solar correlation representation 230, and a distribution 232 of data values of the variable of interest 228.

The regression evaluation information 206 comprises: a calculated coefficient of determination 234, a regression plot 236, calculated upper acceptance bound and lower acceptance bound 238, calculation 240 of a number of remaining samples associated with the given use case that are to be analysed, and calculation 242 of key items that are to be tested.

The influence diagnostics information 208 comprises: calculated influential key item(s) 244, an influence table 246, an influence filter 248, and an influence scatter plot 250.

Lastly, the output 210 pertaining to the regression planning and evaluation system comprise: the number of remaining samples associated with the given use case that are to be analysed 252, and a number of key items that are required to be tested 254. The output 210 optionally include information that triggers procurement of additional input data 212, for example to allow the system to resolve errors or distortions present in parts of the input data 212.

It will be appreciated that FIG. 2 is merely an example, which should not unduly limit the scope of the claims herein. A person skilled in the art will recognize many variations, alternatives, and modifications of embodiments of the present disclosure.

Referring to FIGS. 3A, 3B, 3C, 3D and 3E, there are shown illustrations of exemplary regression planning and regression evaluation information that can be represented via an interactive user interface, in accordance with an exemplary embodiment of the present disclosure.

Figure 3A:
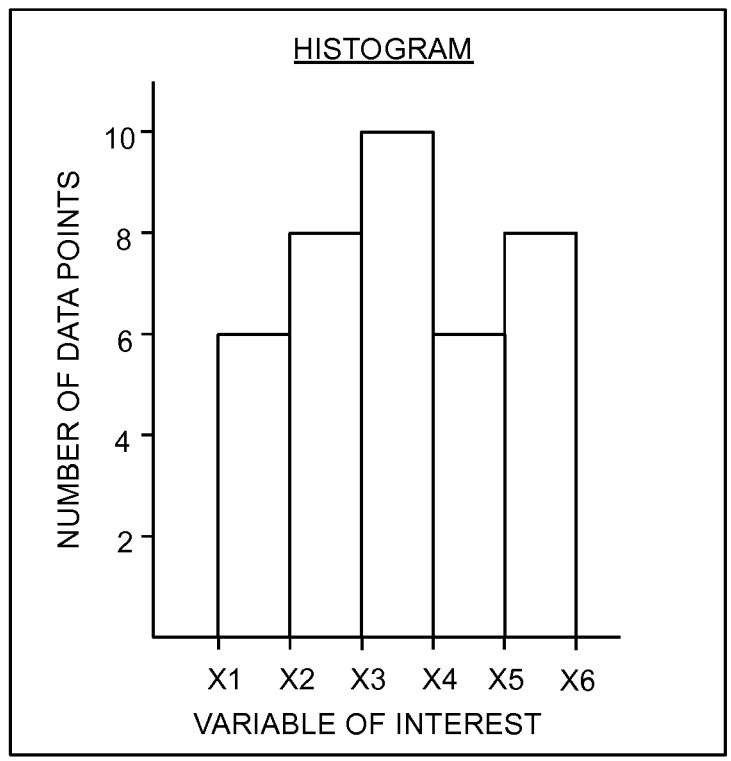
FIGS. 3A, 3B, 3C, 3D and 3E are illustrations of exemplary regression planning information and regression evaluation information that is susceptible to being represented via an interactive user interface, in accordance with an embodiment of the present disclosure.

In FIG. 3A, there is shown a depiction of a histogram which describes a distribution of data values of a variable of interest. The aforesaid histogram pertains to regression planning information, and allows for a user to understand and analyse the variable of interest in a user-friendly manner. As shown, the horizontal axis of the histogram depicts data value intervals X1-X2, X2-X3, X3-X4, X4-X5 and X5-X6 within which the data values of the variable of interest lie, and the vertical axis of the histogram depicts a number of samples having data values lying within a given data value interval. As an example, ten data values of the variable of interest lie between the data value interval X3-X4.

Figure 3B:
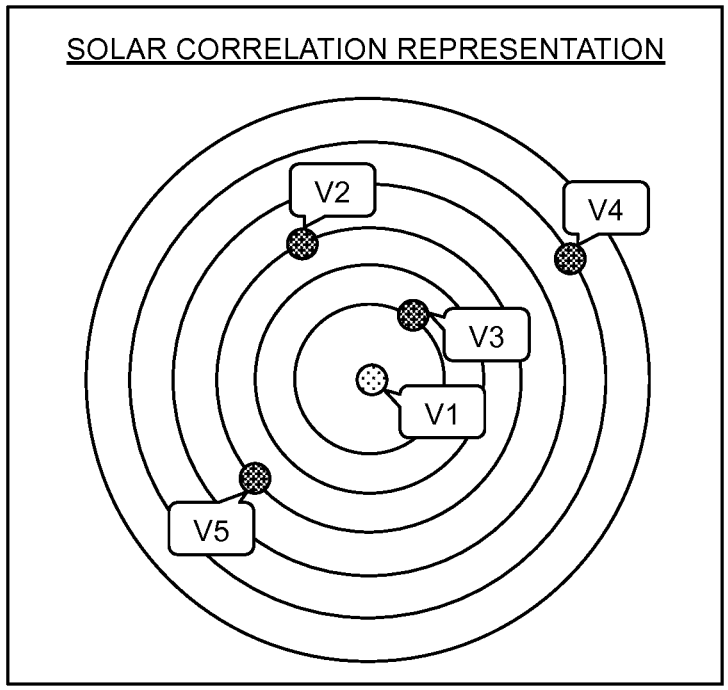

FIG. 3B is a "solar" correlation representation which depicts an impact of remaining variables V2, V3, V4 and V5 of a set of variables V1-V5, on a variable of interest V1 selected from amongst the set of variables V1-V5; the description "solar" is used to indicate a manner of organizing computed output data in a manner that represent astronomical celestial bodies. As shown, the solar correlation representation depicts the variable of interest V1 to be arranged at a centre of the solar correlation representation, and a plurality of concentric orbits around the variable of interest V1. Notably, each of the plurality of concentric orbits represents a distinct correlation coefficient. A given remaining variable is arranged in an orbit based on a given correlation coefficient between the given remaining variable and the variable of interest V1. As shown, V1 is the variable of interest and V2, V3, V4 and V5 are remaining variables. The plurality of concentric orbits could be arranged around the variable of interest V1 in a manner that a distance of a given orbit from the variable of interest V1 is inversely proportional to its corresponding correlation coefficient. In such a scenario, the orbit including the variable V3 would have a higher correlation coefficient as compared to the orbit including the variable V4. By inspection, FIG. 3B assists to determine where errors and distortion exist in the input data 212 that needs to be resolved by analysis or by collected additional input data 212, or a combination of both.

Figures 3C, 3D:
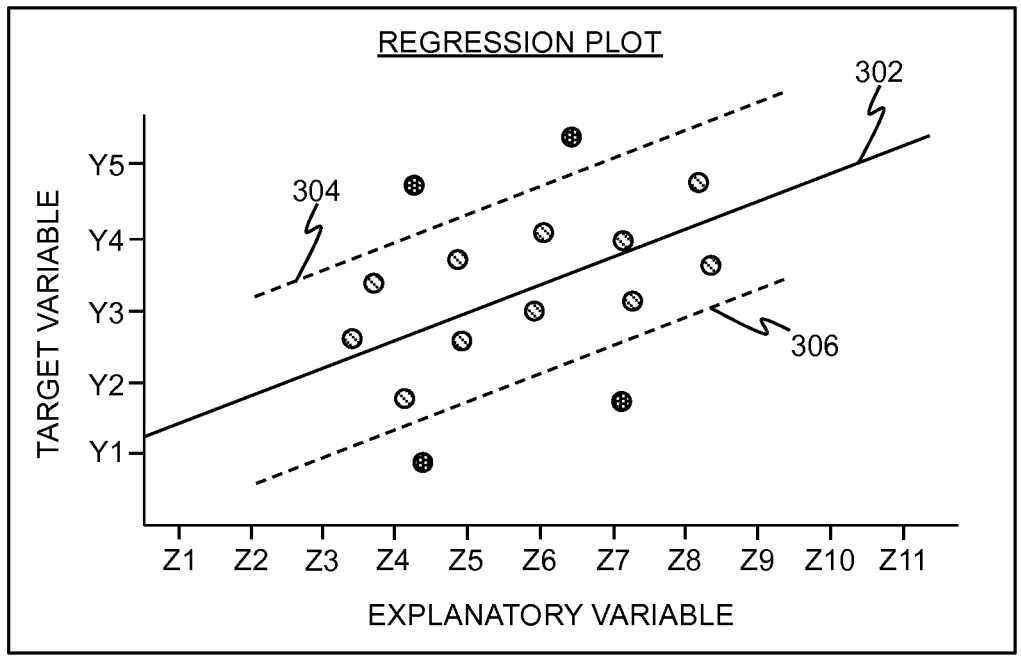

In FIG. 3C, there is shown a depiction of a regression plot which represents a variation of a given target variable with respect to a given explanatory variable. As shown, the vertical axis of the regression plot depicts values of the given target variable (for example, such as, Y1-Y5) and the horizontal axis of the regression plot depicts values of the given explanatory variable (for example, such as, Z1-Z11). The regression plot depicts a regression line 302, an upper acceptance bound 304 and a lower acceptance bound 306; these bounds 304, 306 are effectively thresholds. Notably, samples that fall outside the upper acceptance bound 304 and the lower acceptance bound 306 are identified as key items that are required to be tested; such testing is, for example, required, potentially, because the samples falling outside the bounds 304, 306 potentially correspond to errors or distortions in the input data 212. In the regression plot, the identified key items are depicted as darkened circles whereas samples lying within the upper acceptance bound 304 and the lower acceptance bound 306 are depicted as light circles.

In FIG. 3D, there is shown a depiction of inputs that are to be obtained from a user, via the interactive user interface. The inputs comprise a plurality of audit parameters such as assurance level to be achieved, combined risk assessment (depicted as "CRA"), a tolerable error and a statistical sampling technique. As shown, the assurance level can be provided by way of selection from a dropdown menu and/or adjustment of a slider. The combined risk assessment can be provided by way of selection from another dropdown menu. The value of tolerable error can be provided by the user entering a value in an input field. The statistical sampling technique can be selected via yet another dropdown menu.

Figure 3E:
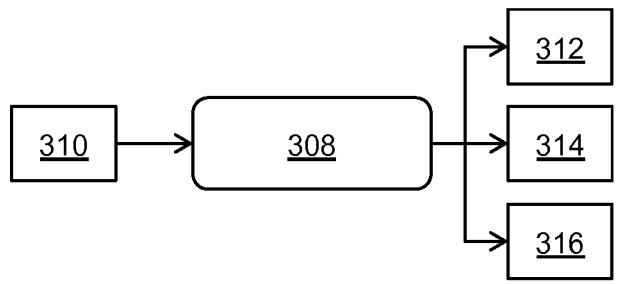

In FIG. 3E, there is shown a depiction of an optimisation option 308 that can be provided in the interactive user interface. Notably, the optimisation option 308 finds an optimal combination of a plurality of audit parameters 310 that allow for obtaining a minimum number of key items (namely essential items) that are required to be tested. The optimisation option 308 allows for obtaining: optimised upper acceptance bound and the lower acceptance bound 312, optimised minimum number of key items 314, and an optimal sample size 316 of a number of remaining samples associated with the given use case, that are to be subsequently analysed for obtaining audit evidence (for example, audit evidence that a given manufacturing process is performing to a required standard of manufacturing consistency).

It will be appreciated that FIGS. 3A-3E are merely examples, which should not unduly limit the scope of the claims herein. A person skilled in the art will recognize many variations, alternatives, and modifications of embodiments of the present disclosure.

Figure 4:
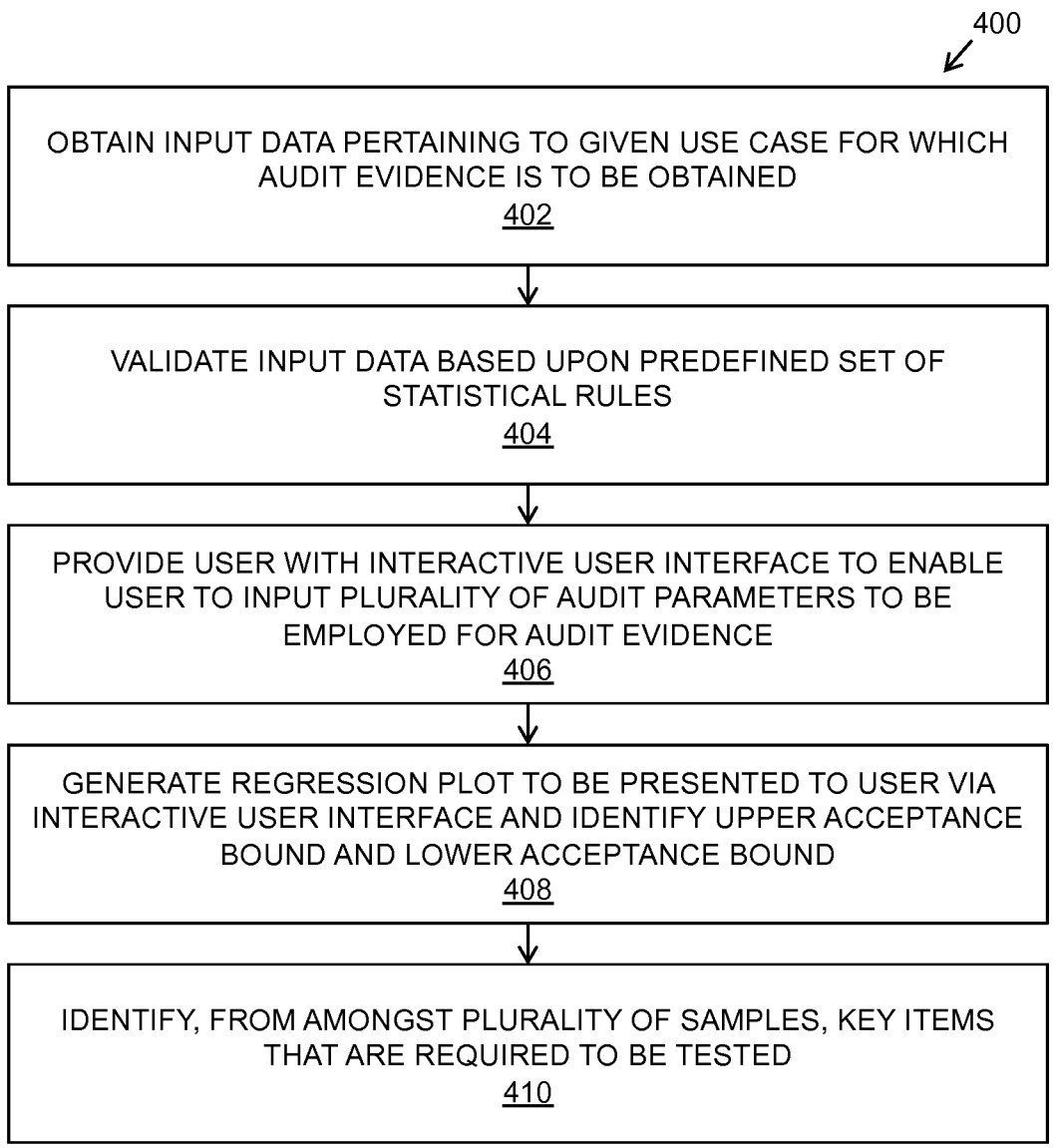
FIG. 4 is an illustration of steps of a method for (of) obtaining audit evidence, in accordance with an embodiment of the present disclosure.

Referring to FIG. 4, there is shown an illustration of steps of a method 400 of obtaining audit evidence, in accordance with an embodiment of the present disclosure. At a step 402, input data is obtained, the input data pertaining to a given use case for which the audit evidence is to be obtained; for example, the input data can be entered manually, acquired from sensor arrangements, from inspection cameras, from measuring instruments such as laser metrology, and such like. The input data comprises data values of a set of variables for a plurality of samples associated with the given use case. At a step 404, the input data is validated based on a predefined set of statistical rules. At a step 406, a user is provided with an interactive user interface to enable the user to input a plurality of audit parameters to be employed for the audit evidence. Furthermore, the plurality of audit parameters comprise at least one of: an assurance level to be achieved, a tolerable error, a statistical sampling technique to be employed. At a step 408, a regression plot to be presented to the user via the interactive user interface is generated, and an upper acceptance bound and a lower acceptance bound to be indicated with respect to a regression line in the regression plot is identified; these bounds are, for example, thresholds that define acceptable limits for errors or distortions. The regression plot represents a variation of a target variable with respect to at least one explanatory variable. Furthermore, the regression plot is generated for the plurality of samples. Moreover, the upper acceptance bound and the lower acceptance bound are identified based on the plurality of audit parameters. At a step 410, key items that are required to be tested, are identified from amongst the plurality of samples. The key items are samples that fall outside the upper acceptance bound and the lower acceptance bound in the regression plot.

The steps 402 to 410 are only illustrative and other alternatives can also be provided where one or more steps are added, one or more steps are removed, or one or more steps are provided in a different sequence without departing from the scope of the claims herein.

Figure 5:
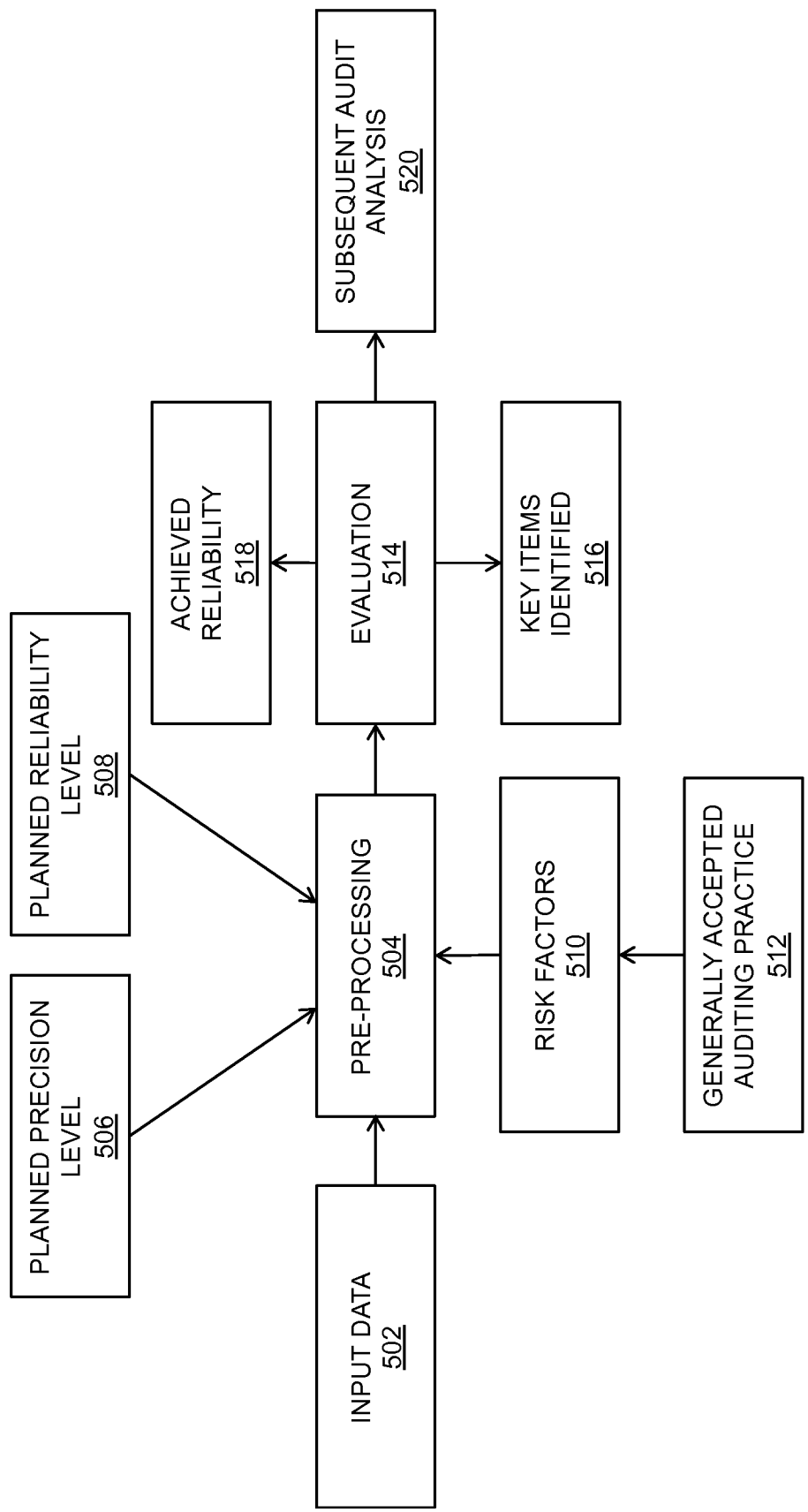
FIG. 5 is an illustration of a high-level method implementation, in accordance with an embodiment of the present disclosure.

Referring to FIG. 5, there is shown an illustration of a high-level method implementation, in accordance with an embodiment of the present disclosure. As shown, an input data 502 is obtained from a source of input data. Thereafter, the input data 502 undergoes at least one pre-processing operation 504 that is associated with obtaining the audit evidence. As an example, the pre-processing operation 504 could include validation of the input data and reconciliation of the input data; such reconciliation of the input data includes resolving errors and distortions, for example by procuring iteratively further input data 502 from a given environment, facility or similar, for example by way of measurements, sensing and such like. The validation of the input data allows for ensuring a planned precision level 506 and a planned reliability level 508 of the input data, prior to its processing for obtaining the audit evidence. A predefined set of statistical rules allow for validating the input data 502 by way of the aforesaid validation operation, in a manner that the input data 502 has a certain level of quality and format that is appropriate for subsequent analysis of the input data 502 for obtaining the audit evidence. The validation of the input data 502 may also allow for reducing audit risk that is associated with known risk factors 510 in generally accepted auditing practices 512. The input data 502 which undergoes pre-processing operation 504 further undergoes a regression planning operation (not shown). Thereafter, the input data 502 undergoes a regression evaluation operation 514, which allows for identifying key items 516. Beneficially, the regression evaluation operation 514 allows for achieving a desired reliability 518 of the obtained audit evidence, namely a reduction of errors and distortions in output data provided from the system. On obtaining the audit evidence, a subsequent audit analysis 520 may be conducted by a user.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A regression planning and evaluation system that processes input data obtained from an environment, wherein the regression planning and evaluation system, when operated, obtains audit evidence by detecting distortions or inaccuracies of the input data, characterized in that the regression planning and evaluation system comprises a server arrangement that is configured to:
   (a) obtain input data pertaining to a given use case for which the audit evidence is to be obtained, the input data comprising data values of a set of variables for a plurality of samples associated with the given use case;
   (b) validate the input data based on a predefined set of statistical rules;
   (c) provide a user with an interactive user interface to enable the user to input a plurality of audit parameters to be employed for the audit evidence, the plurality of audit parameters comprising at least one of: an assurance level to be achieved, a tolerable error, a statistical sampling technique to be employed;
   (d) generate a regression plot to be presented to the user via the interactive user interface and identify an upper acceptance bound and a lower acceptance bound to be indicated with respect to a regression line in the regression plot, the regression plot representing a variation of a target variable with respect to at least one explanatory variable, wherein the regression plot is to be generated for the plurality of samples, and wherein the upper acceptance bound and the lower acceptance bound are to be identified based on the plurality of audit parameters; and
   (e) identify, from amongst the plurality of samples, key items that are required to be tested, the key items being samples that fall outside the upper acceptance bound and the lower acceptance bound in the regression plot, wherein the server arrangement is further configured to provide an optimisation option in the interactive user interface that, when selected by the user, optimises the plurality of audit parameters in a manner that the number of key items that are required to be tested is reduced.

2. The regression planning and evaluation system of claim 1, wherein an identification of the key parameters performed by the system causes the system to acquire further input data to resolve distortions or inaccuracies associated with the key items, and wherein the further data is obtained from at least one of: manual data entry, sensor signals, equipment measurements, image capture, database access.

3. The regression planning and evaluation system of claim 1, wherein the server arrangement is coupled to a regression module coupled in communication with the server arrangement for performing regression computations.

4. The regression planning and evaluation system of claim 3, wherein the regression module is implemented by employing a configuration of field-programmable gate arrays (FPGA's) and reduced instruction set (RISC) computers.

5. The regression planning and evaluation system of claim 4, wherein the reduced instruction set (RISC) computers are reconfigured in response to a structure of data received thereat to be processed, allocating one or more regression computations to a given reduced instruction set (RISC) computer, and by performing correlations by way of data exchange between a plurality of the reduced instruction set (RISC) computers.

6. The regression planning and evaluation system of claim 1, wherein the server arrangement is configured to:
  enable, via the interactive user interface, the user to adjust the assurance level to be achieved and/or the tolerable error for the audit evidence; and
  iteratively perform (d) and (e) for the adjusted assurance level and/or the adjusted tolerance error.

7. The regression planning and evaluation system of claim 1, wherein the server arrangement is configured to enable, via the interactive user interface, the user to reconcile the validated input data to a source from where the input data was obtained at (a).

8. The regression planning and evaluation system of claim 1, wherein the server arrangement is configured to determine relationships existing between the variables of the set.

9. The regression planning and evaluation system of claim 8, wherein the server arrangement is configured to:
  enable, via the interactive user interface, the user to select a variable of interest from the set of variables;
  determine an impact of remaining variables of the set on the variable of interest, based on the relationships existing between the variables; and
  represent, via the interactive user interface, the impact of the remaining variables on the variable of interest.

10. The regression planning and evaluation system of claim 9, wherein the server arrangement is configured to represent, via the interactive user interface, inter-relations that exist between the remaining variables.

11. The regression planning and evaluation system of claim 8, wherein the server arrangement is configured to:
  enable, via the interactive user interface, the user to select, from amongst the set of variables, the target variable and a plurality of explanatory variables;
  determine an impact of the plurality of explanatory variables on the target variable, based on the relationships existing between the variables; and
  represent, via the interactive user interface, a residual plot indicative of the impact of the plurality of explanatory variables on the target variable.

12. A method for obtaining audit evidence, the method comprising using regression planning and evaluation system that processes input data obtained from an environment, wherein the regression planning and evaluation system, when operated, obtains audit evidence by detecting distortions or inaccuracies of the input data, wherein the method includes:
  (a) obtaining input data pertaining to a given use case for which the audit evidence is to be obtained, the input data comprising data values of a set of variables for a plurality of samples associated with the given use case;
  (b) validating the input data based on a predefined set of statistical rules;
  (c) providing a user with an interactive user interface to enable the user to input a plurality of audit parameters to be employed for the audit evidence, the plurality of audit parameters comprising at least one of: an assurance level to be achieved, a tolerable error, a statistical sampling technique to be employed;
  (d) generating a regression plot to be presented to the user via the interactive user interface and identifying an upper acceptance bound and a lower acceptance bound to be indicated with respect to a regression line in the regression plot, wherein the regression plot represents a variation of a target variable with respect to at least one explanatory variable, the regression plot being generated for the plurality of samples, the upper acceptance bound and the lower acceptance bound being identified based on the plurality of audit parameters; and
  (e) identifying, from amongst the plurality of samples, key items that are required to be tested, the key items being samples that fall outside the upper acceptance bound and the lower acceptance bound in the regression plot,
wherein the method further comprises providing an optimisation option in the interactive user interface that, when selected by the user, optimises the plurality of audit parameters in a manner that the number of key items that are required to be tested is reduced.

13. The method of claim 12, wherein the method further includes arranging for the server arrangement to be coupled to a regression module that is coupled in communication with the server arrangement for performing regression computations.

14. The method of claim 13, wherein the method further comprises arranging for the regression module to be implemented by employing a configuration of field-programmable gate arrays (FPGA's) and reduced instruction set (RISC) computers.

15. The method of claim 14, wherein the method includes implementing the reduced instruction set (RISC) computers to be reconfigurable in response to a structure of data received thereat to be processed, allocating one or more regression computations to a given reduced instruction set (RISC) computer, and by performing correlations by way of data exchange between a plurality of the reduced instruction set (RISC) computers.

16. The method of claim 13, wherein the method further comprises using the regression planning and evaluation system for:
  enabling, via the interactive user interface, the user to adjust the assurance level to be achieved and/or the tolerable error for the audit evidence; and
  iteratively performing the steps (d) and (e) for the adjusted assurance level and/or the adjusted tolerance error.

17. The method of claim 12, further comprising using the regression planning and evaluation system for enabling, via the interactive user interface, the user to reconcile the validated input data to a source from where the input data was obtained at the step (a).

18. The method of claim 12, wherein the method further comprises using the regression planning and evaluation system for determining relationships existing between the variables of the set.

19. The method of claim 18, wherein the method further comprises using the regression planning and evaluation system for:
  enabling, via the interactive user interface, the user to select a variable of interest from the set of variables;

determining an impact of remaining variables of the set on the variable of interest, based on the relationships existing between the variables; and representing, via the interactive user interface, the impact of the remaining variables on the variable of interest.

20. The method of claim 19, wherein the method further comprises using the regression planning and evaluation system for representing, via the interactive user interface, inter-relations that exist between the remaining variables.

21. The method of claim 18, wherein the method further comprises using the regression planning and evaluation system for:

enabling, via the interactive user interface, the user to select, from amongst the set of variables, the target variable and a plurality of explanatory variables;

determining an impact of the plurality of explanatory variables on the target variable, based on the relationships existing between the variables; and representing, via the interactive user interface, a residual plot indicative of the impact of the plurality of explanatory variables on the target variable.

22. A software product comprising a non-transitory machine-readable data storage medium having stored thereon program instructions that, when executed by a processing device, cause the processing device to:

(a) obtain input data pertaining to a given use case for which an audit evidence is to be obtained, the input data comprising data values of a set of variables for a plurality of samples associated with the given use case;

(b) validate the input data based on a predefined set of statistical rules;

(c) provide a user with an interactive user interface to enable the user to input a plurality of audit parameters to be employed for the audit evidence, the plurality of audit parameters comprising at least one of: an assurance level to be achieved, a tolerable error, a statistical sampling technique to be employed;

(d) generate a regression plot to be presented to the user via the interactive user interface and identify an upper acceptance bound and a lower acceptance bound to be indicated with respect to a regression line in the regression plot, wherein the regression plot represents a variation of a target variable with respect to at least one explanatory variable, and wherein the regression plot is to be generated for the plurality of samples, further wherein the upper acceptance bound and the lower acceptance bound are to be identified based on the plurality of audit parameters; and (e) identify, from amongst the plurality of samples, key items that are required to be tested, the key items being samples that fall outside the upper acceptance bound and the lower acceptance bound in the regression plot, wherein the processing device is further configured to provide an optimisation option in the interactive user interface that, when selected by the user, optimises the plurality of audit parameters in a manner that the number of key items that are required to be tested is reduced.

23. The software product of claim 22, wherein the program instructions, when executed by the processing device, cause the processing device to:

enable, via the interactive user interface, the user to adjust the assurance level to be achieved and/or the tolerable error for the audit evidence; and iteratively perform (d) and (e) for the adjusted assurance level and/or the adjusted tolerance error.

\* \* \* \* \*